(12) United States Patent
Qiu et al.

(10) Patent No.: US 12,072,556 B2
(45) Date of Patent: Aug. 27, 2024

(54) CONTACT LENSES WITH SURFACES HAVING DIFFERENT SOFTNESS

(71) Applicant: Alcon Inc., Fribourg (CH)

(72) Inventors: Yongxing Qiu, Suwanee, GA (US); Robert Carey Tucker, Suwanee, GA (US); Yeming Gu, Suwanee, GA (US)

(73) Assignee: Alcon Inc., Fribourg (CH)

( * ) Notice: Subject to any disclaimer, the term of this patent is extended or adjusted under 35 U.S.C. 154(b) by 780 days.

(21) Appl. No.: 17/087,963

(22) Filed: Nov. 3, 2020

(65) Prior Publication Data
US 2021/0132411 A1    May 6, 2021

Related U.S. Application Data

(60) Provisional application No. 62/930,163, filed on Nov. 4, 2019.

(51) Int. Cl.
*G02C 7/04* (2006.01)
*B29D 11/00* (2006.01)
*B29K 67/00* (2006.01)
*B29K 83/00* (2006.01)
*G02B 1/04* (2006.01)

(52) U.S. Cl.
CPC ........ *G02C 7/049* (2013.01); *B29D 11/00048* (2013.01); *B29D 11/00067* (2013.01); *G02B 1/043* (2013.01); *B29K 2067/00* (2013.01); *B29K 2083/00* (2013.01)

(58) Field of Classification Search
CPC .............. G02C 7/049; B29D 11/00048; B29D 11/00067; G02B 1/043; B29K 2067/00; B29K 2083/00

USPC ....................................................... 351/159.33
See application file for complete search history.

(56) References Cited

U.S. PATENT DOCUMENTS

| | | | |
|---|---|---|---|
| 3,408,429 | A | 10/1968 | Wichterle |
| 4,042,552 | A | 8/1977 | Grucza |
| 4,045,547 | A | 8/1977 | Le Boeuf |
| 4,136,250 | A | 1/1979 | Mueller |
| 4,143,949 | A | 3/1979 | Chen |

(Continued)

FOREIGN PATENT DOCUMENTS

| | | |
|---|---|---|
| AU | 2014221267 B2 | 5/2016 |
| EP | 0632329 A1 | 1/1995 |

(Continued)

OTHER PUBLICATIONS

D. Auciello et al. (ed.) "Plasma-Surface Interactions and Processing of Materials"; The Application of Plasmas to ThinFilm Deposition Processes; Kluwer Academic Publishers, 1990, pp. 377-399.

(Continued)

*Primary Examiner* — Sharrief I Broome
(74) *Attorney, Agent, or Firm* — Jian Zhou

(57) ABSTRACT

The invention is related to a contact lens, especially a SiHy contact lens, which comprises a lens bulk material covered with an outer surface hydrogel layer thereon and has a posterior surface and an opposite anterior surface. The outer surface hydrogel layer consists of an anterior outer hydrogel layer and a posterior outer hydrogel layer. A contact lens of the invention is characterized by having a difference in surface softness between its posterior (BC) and anterior (FC) surfaces.

15 Claims, 5 Drawing Sheets

(56) References Cited

U.S. PATENT DOCUMENTS

| | | |
|---|---|---|
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyohima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,198,477 A | 3/1993 | Von Der Haegen |
| 5,219,965 A | 6/1993 | Valint, Jr. |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lai |
| 5,464,667 A | 11/1995 | Koehler |
| 5,486,579 A | 1/1996 | Lai |
| 5,508,317 A | 4/1996 | Müller |
| 5,583,163 A | 12/1996 | Müller |
| 5,583,463 A | 12/1996 | Merritt |
| 5,599,576 A | 2/1997 | Opolski |
| 5,760,100 A | 6/1998 | Nicolson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,075,066 A * | 6/2000 | Matsuda ............... G02B 1/043 536/55.1 |
| 6,087,415 A | 7/2000 | Vanderlaan |
| 6,096,726 A | 8/2000 | Opolski |
| 6,099,122 A | 8/2000 | Chabrecek et al. |
| 6,166,236 A | 12/2000 | Bambury |
| 6,303,687 B1 | 10/2001 | Muller |
| 6,340,465 B1 | 1/2002 | Hsu |
| 6,367,929 B1 | 4/2002 | Maiden et al. |
| 6,436,481 B1 | 8/2002 | Chabrecek et al. |
| 6,440,571 B1 | 8/2002 | Valint, Jr. et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,500,481 B1 | 12/2002 | Vanderlaan et al. |
| 6,521,352 B1 | 2/2003 | Chabrecek et al. |
| 6,534,559 B1 | 3/2003 | Vanderlaan |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,683,062 B2 | 1/2004 | Opolski |
| 6,719,929 B2 | 4/2004 | Winterton et al. |
| 6,730,366 B2 | 5/2004 | Lohmann et al. |
| 6,734,321 B2 | 5/2004 | Chabracek et al. |
| 6,762,264 B2 | 7/2004 | Kuenzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,822,016 B2 | 11/2004 | McCabe et al. |
| 6,835,410 B2 | 12/2004 | Chabrecek et al. |
| 6,838,491 B1 | 1/2005 | Vanderlaan |
| 6,866,936 B2 | 3/2005 | Opolski |
| 6,867,245 B2 | 3/2005 | Iwata et al. |
| 6,878,399 B2 | 4/2005 | Chabrecek et al. |
| 6,881,269 B2 | 4/2005 | Matsuzawa |
| 6,896,926 B2 | 5/2005 | Qiu et al. |
| 6,923,978 B2 | 8/2005 | Chatelier et al. |
| 7,078,074 B2 | 7/2006 | Matsuzawa |
| 7,214,809 B2 | 5/2007 | Zanini et al. |
| 7,279,507 B2 | 10/2007 | Hu |
| 7,384,590 B2 | 6/2008 | Kelly et al. |
| 7,387,759 B2 | 6/2008 | Kelly et al. |
| 7,423,074 B2 | 9/2008 | Lai |
| 7,605,190 B2 | 10/2009 | Moszner et al. |
| 7,858,000 B2 | 12/2010 | Winterton |
| 8,030,369 B2 | 10/2011 | Winterton |
| 8,044,112 B2 | 10/2011 | Matsuzawa |
| 8,147,897 B2 | 4/2012 | Ferreiro et al. |
| 8,158,192 B2 | 4/2012 | Bothe |
| 8,409,599 B2 | 4/2013 | Wu |
| 8,415,405 B2 | 4/2013 | Maggio |
| 8,475,529 B2 | 7/2013 | Clarke |
| 8,480,227 B2 | 7/2013 | Qiu |
| 8,529,057 B2 | 9/2013 | Qiu |
| 8,614,261 B2 | 12/2013 | Iwata et al. |
| 8,658,748 B2 | 2/2014 | Liu et al. |
| 8,835,525 B2 | 9/2014 | Kuyu |
| 8,993,651 B2 | 3/2015 | Chang |
| 9,097,840 B2 | 8/2015 | Chang et al. |
| 9,103,965 B2 | 8/2015 | Chang |
| 9,156,213 B2 | 10/2015 | Qiu |
| 9,217,813 B2 | 12/2015 | Liu |
| 9,244,195 B2 | 1/2016 | Bauman |
| 9,475,827 B2 | 10/2016 | Chang et al. |
| 9,804,295 B2 | 10/2017 | Winterton et al. |
| 10,081,697 B2 | 9/2018 | Huang et al. |
| 10,155,349 B2 | 12/2018 | Pruitt et al. |
| 10,301,451 B2 | 5/2019 | Jing et al. |
| 2007/0122540 A1 | 5/2007 | Salamone |
| 2008/0142038 A1 | 6/2008 | Kunzler |
| 2009/0145086 A1 | 6/2009 | Reynolds |
| 2009/0145091 A1 | 6/2009 | Connolly |
| 2011/0134387 A1 | 6/2011 | Samuel |
| 2012/0026457 A1 | 2/2012 | Qiu |
| 2012/0220688 A1* | 8/2012 | Wang ................ G02B 1/043 351/159.33 |
| 2013/0118127 A1 | 5/2013 | Kolluru |
| 2013/0258276 A1* | 10/2013 | Hansen ........... B29D 11/00153 264/1.36 |
| 2013/0337160 A1 | 12/2013 | Holland et al. |
| 2014/0131227 A1* | 5/2014 | Wang ................ G02B 1/043 523/107 |
| 2015/0370093 A1* | 12/2015 | Waite ............. B29D 11/00048 585/16 |
| 2016/0061995 A1 | 3/2016 | Chang et al. |
| 2017/0165932 A1 | 6/2017 | Qian |
| 2018/0030209 A1 | 2/2018 | Sawyer et al. |
| 2018/0081197 A1 | 3/2018 | Qiu |
| 2018/0100038 A1 | 4/2018 | Jing et al. |
| 2019/0176415 A1 | 6/2019 | Qiu et al. |
| 2019/0179055 A1 | 6/2019 | Qiu et al. |

FOREIGN PATENT DOCUMENTS

| | | |
|---|---|---|
| EP | 1465931 B1 | 8/2007 |
| JP | S5057297 U | 5/1975 |
| JP | 2001-075060 A | 3/2001 |
| JP | 2013533517 A | 8/2013 |

(56) References Cited

FOREIGN PATENT DOCUMENTS

| | | |
|---|---|---|
| JP | 2015534106 A | 11/2015 |
| JP | 2018088007 A | 6/2018 |
| WO | 2012016096 A1 | 2/2012 |
| WO | 2012016098 A1 | 2/2012 |
| WO | 2014035912 A1 | 3/2014 |
| WO | 2015073758 A1 | 5/2015 |
| WO | 2019116139 | 6/2019 |

OTHER PUBLICATIONS

Dilsiz, et al., "Plasma Polymerization of Selected Organic Compounds", 1996, pp. 333-342, vol. 37, No. 2, Polymer.
H. Yasuda, "Glow Discharge Polymerization", Journal of Polymer Science: Macromolecular Reviews, vol. 16 (1981), pp. 199-293.
Ho, Yasuda "Ultrathin Coating of Plasma Polymer of Methane Applied on The Surface of Silicone Contact Lenses," Journal of Biomedical Materials Research, vol. 22, pp. 919-937 (1988).
Jansen "Plasma Deposited Thin Films (Chapter 1)" In: Plasma Deposition Processes (19) CRC Press (1986), Boca Raton, FL, Editors: F. Jansen and J. Mort, Ph.D.
R. Hartmann Plasma polymerisation: Grundlagen, Technik and Anwendung, Jahrbuch Oberflachentechnik Band 49, 1993, pp. 283-296, Battelle-Inst. e.V. Frankfurt am Main Germany.

* cited by examiner

CONTACT LENSES WITH SURFACES HAVING DIFFERENT SOFTNESS

This application claims the benefit under 35 USC § 119 (e) of U.S. provisional application No. 62/930,163 filed 4 Nov. 2019, herein incorporated by reference in its entirety.

The present invention generally relates to a contact lens the posterior surface (base curve surface) of which has a surface modulus lower than that of its opposite anterior surface (front curve surface). This invention also relates to a method for making such a contact lens.

BACKGROUND

In recent years, a great number of efforts have been made to develop contact lenses with improved wearing comfort.

One example is to incorporate leacheable wetting agents in contact lenses (see, e.g., U.S. Pat. Nos. 4,045,547, 4,042,552, 5,198,477, 5,219,965, 6,367,929 6,822,016, 7,279,507, 8,030,369, and 9,804,295).

Another example is to incorporate bioactive agents and hydrophobic comfort agents into contact lenses (see, e.g., U.S. Pat. No. 10,155,349).

Also another example is the development of a new class of soft contact lenses, water gradient contact lenses. This new class of soft contact lenses have been first developed and successfully introduced as daily-disposable contact lenses, DAILIES@ TOTAL1@ (Alcon), in the market. Weekly- or monthly-disposable water gradient soft contact lenses have also be developed (see, U.S. Pat. Appl. Pub. No. 2019-0179055 A1). This new class of soft contact lenses is characterized by having a water-gradient structural configuration, an increase in water content observed in passing from the core to the surface of the contact lens, reaching the highest water content in the region near and including the surface of the contact lens (see, U.S. Pat. No. 8,480,227 which is herein incorporated by reference in its entirety). This unique design can deliver a highly-lubricious and extremely-soft, water-rich lens surface that in turn provide superior wearing comfort to patients.

A further example is to make contact lenses having a nano-textured surface which mimics the surface texture of cornea of human eye (see, e.g., U.S. Pat. No. 9,244,195).

SUMMARY OF THE INVENTION

The invention, in one aspect, provides a soft contact lens, preferably a silicone hydrogel contact lens, having a posterior surface that is softer than its opposite anterior surface.

The invention, in another aspect, provides a method for making such a soft contact lens, preferably such a silicone hydrogel contact lens.

This and other aspects of the invention including various preferred embodiments in any combination will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
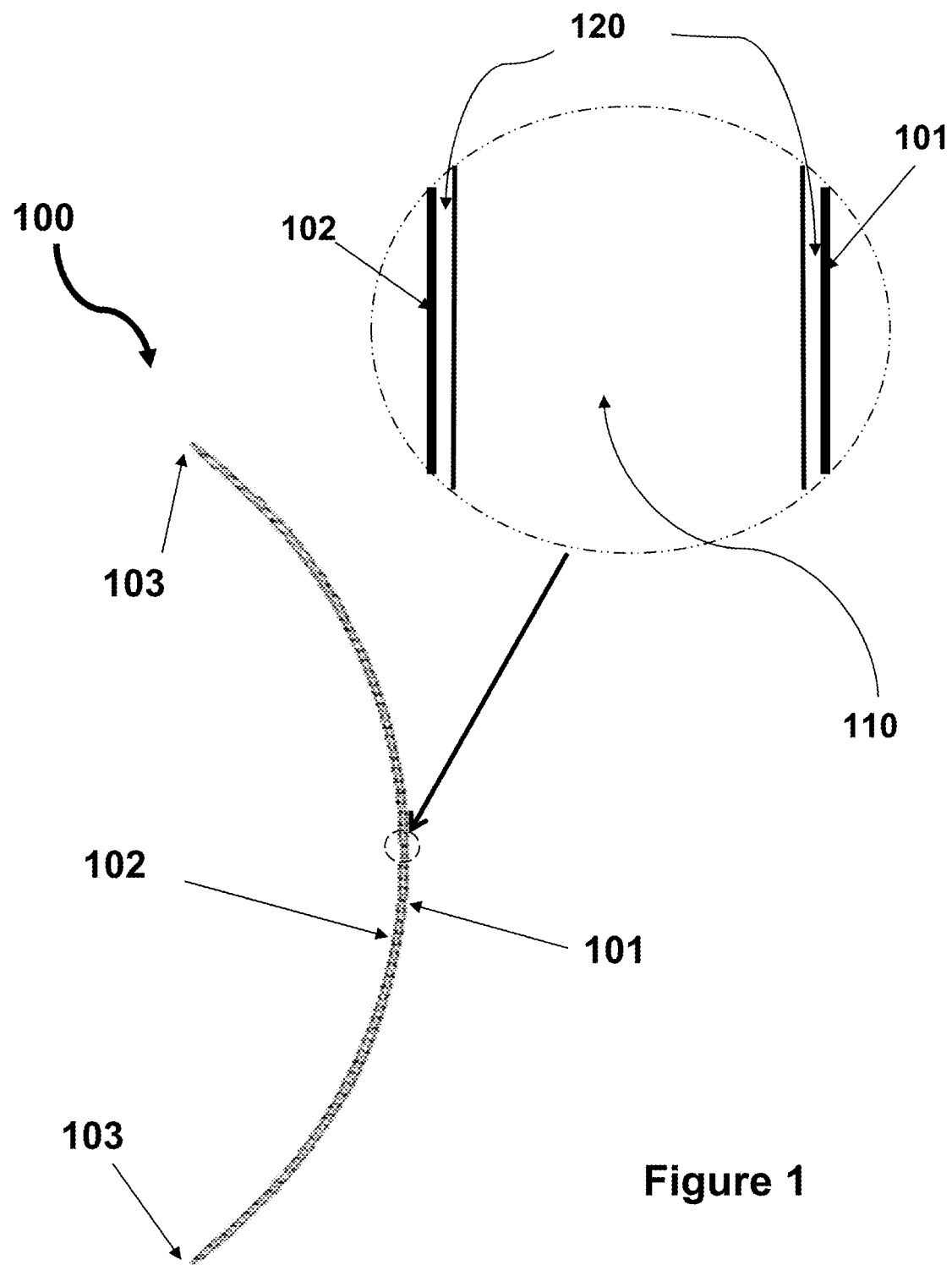
FIG. 1 schematically depicts a sectional view of the structural configuration of a contact lens according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

The term "anterior surface", "front surface", "front curve surface" or "FC surface" in reference to a contact lens, as used in this application, interchangeably means a surface of the contact lens that faces away from the eye during wear. The anterior surface (FC surface) is typically substantially convex.

The "posterior surface", "back surface", "base curve surface" or "BC surface" in reference to a contact lens, as used in this application, interchangeably means a surface of the contact lens that faces towards the eye during wear. The posterior surface (BC surface) is typically substantially concave.

A "hard contact lens" refers a contact lens comprising a hard plastics (e.g., polymethylmethacrylate) as bulk (core) material.

A "rigid gas permeable contact lens" refers to a contact lens comprising a gas permeable material (e.g., a material made from fluorosilicone acrylates) as bulk (core) material.

A soft contact lens can be a non-silicone hydrogel contact lens or a silicone hydrogel contact lens. A "non-silicone hydrogel contact lens" refers to a contact lens comprising a non-silicone hydrogel bulk (core) material. A "silicone hydrogel contact lens" refers to a contact lens comprising a silicone hydrogel bulk (core) material.

A hybrid contact lens has a central optical zone that is made of a gas permeable lens material, surrounded by a peripheral zone made of silicone hydrogel or regular hydrogel lens material.

An embedded contact lens comprises a lens bulk material consisting essentially of a 3-dimensional article and a non-silicone hydrogel material or a silicone hydrogel material, wherein the 3-dimensional article is made of a non-hydrogel material and has a 3-dimensional size smaller than that of the contact lens so that it is completely embedded within a non-silicone hydrogel material or a silicone hydrogel material. A non-hydrogel material can be any material which absorbs less than 10% (preferably about 7.5% or less, more preferably about 5.0% or less, even more preferably about 2.5% or less) by weight of water when being fully hydrated.

A "hydrogel" or "hydrogel material" refers to a crosslinked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" or "SiHy" interchangeably refers to a hydrogel containing silicone. A silicone hydrogel (SiHy) typically is obtained by copolymerization of a polymerizable composition comprising at least one silicone-containing vinylic monomer or at least one silicone-containing vinylic macromer or at least one silicone-containing prepolymer having ethylenically unsaturated groups.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

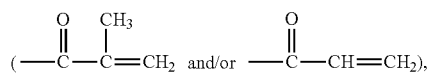

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic polymerizable components of a polymerizable composition to form a solution.

An "acrylic monomer" refers to a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer comprising ethylenically unsaturated groups and having a number average molecular weight of greater than 700 Daltons.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "polymer" means a material formed by polymerizing or crosslinking one or more monomers, macromers, prepolymers and/or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

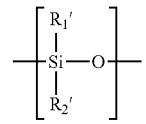

in which $R_1'$ and $R_2'$ are two substituents independently selected from the group consisting of $C_1$-$C_{10}$ alkyl, $C_1$-$C_4$ alkyl- or $C_1$-$C_4$— alkoxy-substituted phenyl, $C_1$-$C_{10}$ fluoroalkyl, $C_1$-$C_{10}$ fluoroether, $C_6$-$C_{13}$ aryl radical, -alk-(OC$_2$H$_4$)$_{\gamma 1}$—OR° (in which alk is $C_1$-$C_6$ alkyl diradical, R° is H or $C_1$-$C_4$ alkyl and γ1 is an integer from 1 to 10), a $C_2$-$C_{40}$ organic radical having at least one functional group selected from the group consisting of hydroxyl group (—OH), carboxyl group (—COOH), —NR$_3$'R$_4$', amino linkages of —NR$_3$'—, amide linkages of —CONR$_3$'—, amide of —CONR$_3$'R$_4$', urethane linkages of —OCONH—, and $C_1$-$C_4$ alkoxy group, or a linear hydrophilic polymer chain, in which $R_3'$ and $R_4'$ independent of each other are hydrogen or a $C_1$-$C_{15}$ alkyl.

A "polysiloxane vinylic monomer" refers to a compound comprising at least one polysiloxane segment and one sole ethylenically-unsaturated group.

A "polysiloxane vinylic crosslinker" refers to a compound comprising at least one polysiloxane segment and at least two ethylenically-unsaturated groups.

A "chain-extended polysiloxane vinylic crosslinker" refers to a compound comprising at least two ethylenically-unsaturated groups and at least two polysiloxane segments each pair of which is linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, the term "poly(2-oxazoline-co-ethyleneimine)" refers to a statistical copolymer or a polymer segment thereof having a formula of

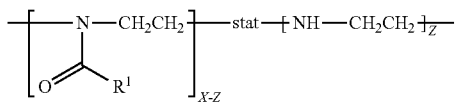

in which: $R^1$ is hydrogen, methyl, ethyl, N-pyrrolidonylmethyl, N-pyrrolidonylethyl, pyrrolidonylpropyl, or a monovalent radical of -alk-$(OC_2H_4)_{m3}$—OR' in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly (2-oxazoline-co-ethyleneimine)-epichlorohydrin are disclosed in a copending U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

As used in this application, the term "phosphorylcholine" refers to a zwitterionic group of

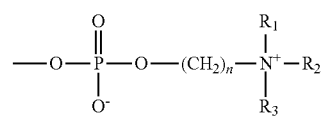

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "carboxyl-containing vinylic monomer" refers to any vinylic monomer having a carboxyl group (—COOH); the term "amino-containing vinylic monomer" refers to any vinylic monomer having an amino group (—NHR').

As used in this application, the term "non-reactive vinylic monomer" refers to any vinylic monomer free of carboxyl group, primary amino group, secondary amino group, epoxide group, isocyanate group, azlactone group

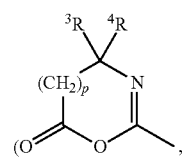

or aziridine group

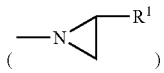

(in which p is 0 or 1; $^3R$ and $^4R$ independently of each other is $C_1$-$C_8$ alkyl; $R^1$ is hydrogen, methyl or ethyl).

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in Example 1 of U.S. patent application publication No. 2012/0026457 A1 (herein incorporated by reference in its entirety). Oxygen permeability is conventionally expressed in units of barrers, where "barrer" is defined as $[(cm^3 oxygen)(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 oxygen)/(cm^2)(sec)(mm Hg)] \times 10^{-9}$.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of occularly irritating or occularly cytotoxic materials according to international ISO standards and U.S. FDA regulations.

The term "water gradient" in reference to a contact lens means that there is an increase in water content observed in passing from the core to the surface of the contact lens, reaching the highest water content in the region near and including the surface of the contact lens. It is understood that the increase in water content from the core to the surface of the contact lens can be continuous and/or step-wise, so long as the water content is highest in the region near and including the surface of the contact lens.

As used in this application, the term "cross section" of a contact lens refers to a lens section obtained by cutting through the lens with a knife or cutting tool at an angle substantially normal to either of the anterior and posterior surfaces of the lens. A person skilled in the art knows well to cut manually (i.e., hand cut), or with Cryosta Microtome or with a lathe, a contact lens to obtain a cross section of the contact lens. A resultant cross section of a contact lens can be polished by using ion etching or similar techniques.

The term "modulus" or "elastic modulus" in reference to a contact lens or a material means the tensile modulus or Young's modulus which is a measure of the stiffness of a contact lens or a material in tension. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

As used in this application, the term "lens bulk material" in reference to a contact lens interchangeably means a layer that has a 3-dimensional shape of a contact lens and includes a central curved plane (which divides the contact lens into two parts, one containing the anterior surface and the other containing the posterior surface) and has a variable thickness.

As used in this application, the term "outer surface hydrogel layer" in reference to a contact lens means an outmost hydrogel layer underneath the surface of the contact lens, which consists of an outer anterior surface hydrogel layer and an outer posterior surface hydrogel layer and which fully covers the lens bulk material. An "outer anterior surface hydrogel layer" in reference to a contact lens means an outmost hydrogel layer underneath the anterior surface of the contact lens. An "outer posterior surface hydrogel layer" in reference to a contact lens means an outmost hydrogel layer underneath the posterior surface of the contact lens. It is understood that the anterior surface consists of the same material as the outer anterior surface hydrogel layer while the posterior surface consists of the same material as the outer posterior surface hydrogel layer.

As used in this application, the term "transition layer" in reference to a contact lens means a layer polymeric material that is located between the inner layer (or the lens bulk material) and one of the anterior and posterior outer hydrogel layers.

The term "surface softness" is used in this application to means an apparent elastic property of a polymeric article (a hydrogel or a silicone hydrogel article) at one of its surface, as measured by an indentation depth at 5 KPa compression pressure of an indenting probe having a tip radius of 9.5 μm and a stiffness of 0.54 N/m in a nanoindentation test (as described in Example 1). The 5 kPa compression pressure is used to simulate eyelid pressure, typically between 1-5 kPa. Other probe tip radii or cantilever stiffness could be used, depending upon the surface softness. Stiffer probes could be used for stiffer materials.

The apparent surface compliance (i.e., surface softness) of a contact lens with outer surface hydrogel layer thereon at one of the two surfaces depends upon on the surface modulus (or Young's modulus) of the outer surface hydrogel layer on top of the core, at small indents (<10% of total lens thickness). As known to a person skilled in the art, the surface modulus of a hydrogel correlates with the mesh size of the hydrogel, because the mesh size of the hydrogel is inversely proportional to the crosslinking density of the hydrogel while being proportional to the lengths of crosslinking chains (see, U.S. Pat. No. 2018/0030209). Due to the correlation between the mesh size and the equilibrium water content of a hydrogel, the surface modulus of a hydrogel can inversely correlate with the equilibrium water content of that hydrogel. The higher the surface modulus of a hydrogel is, the lower the equilibrium water content is. Consequently, the larger an indentation depth at 5 KPa is, the lower the elastic modulus of the outer surface hydrogel layer on a contact lens at one of its surface is.

The apparent surface property (i.e., surface softness) of a contact lens with outer surface hydrogel layer thereon at one of the two surfaces also depends upon on the thickness of the outer surface hydrogel layer underneath that surface, because the outer surface hydrogel layer can be much softer than a lens bulk material. The larger an indentation depth at 5 KPa is, the thicker the outer surface hydrogel layer on a contact lens at one of its surface is.

Therefore, the indentation depth at 5 KPa compression pressure (or any fixed compression pressure) of a contact lens at one of its surface can be a good indicator for both surface modulus (or equilibrium water content) and/or the thickness of an outer surface hydrogel layer at the surface.

In this application, the "average thickness" of an outer anterior or posterior surface hydrogel layer or a transition layer is simply referred to as the "thickness of an outer anterior surface hydrogel layer", "thickness of an outer posterior surface hydrogel layer" or "thickness of a transition layer", as measured with AFM, environmental scanning electron microscopy, confocal fluorescence microscopy, or any technique known to a person skilled in the art on a cross section of the contact lens in an indicated state, e.g., in fully hydrated state or when being fully hydrated (i.e., in a phosphate buffered solution, pH~7.3±0.2), or in dry state (e.g., fully oven-dried).

FIG. 1 schematically illustrates a contact lens of the invention, according to a preferred embodiment. In accordance with this preferred embodiment of the invention, the contact lens 100 has an anterior surface (or front curve or convex surface) 101 and an opposite posterior surface (or base curve or concave surface) 102 which is rest on the cornea of the eye when worn by a user. The contact lens 100 comprises a lens bulk material 110, an outer anterior surface hydrogel layer 121 and an outer posterior surface hydrogel layers 122. The lens bulk material 110 has a 3-dimensional shape very close to the contact lens 100. The outer anterior and posterior surface hydrogel layers 120 are made of a hydrogel material substantially free of silicone (preferably totally free of silicone) having a higher water content relative to that of the inner layer 110. The anterior and posterior outer hydrogel layers 120 merge at the peripheral edge 103 of the contact lens 100 and cover completely the inner layer 110.

As used in this application, the term "equilibrium water content" in reference to a contact lens or a polymeric material means the amount (expressed as percent by weight) of water present in the contact lens or the polymeric material when being fully hydrated (equilibrated) in phosphate buffered saline solution (ca. 0.79 wt % NaCl) and determined at room temperature (as defined above).

As used in this application, the term "crosslinked coating" or "hydrogel coating" or "hydrogel layer" on a contact lens interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed or covalently attached onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Pat. Appl. Pub. Nos. 2011/0134387, 2012/0026457 and 2013/0118127.

The invention is generally related to a contact lens, especially a SiHy contact lens which is characterized by having a difference in surface softness between its posterior (BC) and anterior (FC) surfaces. The posterior surface of a contact lens of the invention, which is in direct contact with the cornea and its softness, is much softer than the anterior surface and has more impact upon the wearing comfort.

In one aspect, the invention provides a contact lens, comprising a lens bulk material covered with an outer surface hydrogel layer and having a posterior surface and an opposite anterior surface, wherein the outer surface hydrogel layer consists of an anterior outer hydrogel layer and a posterior outer hydrogel layer, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.2 (preferably at least about 1.3, more preferably at least about 1.4, even more preferably at least about 1.5, most preferably at least about 1.6), wherein $(Id)_{PS}$ is the indentation depth measured with a indenting probe having a tip radius of 9.5 μm and a stiffness of 0.54 N/m at 5 KPa compression pressure against the posterior surface in a nanoindentation test, wherein $(Id)_{AS}$ is the indentation depth measured with a indenting probe having a tip radius of 9.5 μm and a stiffness of 0.54 N/m at 5 KPa compression pressure against the anterior surface in a nanoindentation test.

In another aspect, the invention provides a method for making coated contact lenses, comprising the steps of: (1) obtaining a contact lens precursor which has a concave surface and an opposite convex surface and comprises a lens bulk material and first reactive functional groups on and/or near the anterior and posterior surfaces, wherein the first reactive functional groups are selected from the group consisting of carboxyl groups, amino groups, azetidinium groups, epoxide groups, aziridine groups, vinylsulfone groups, thiol groups, and combinations thereof (preferably from the group consisting of carboxyl groups, amino groups, azetidinium groups, epoxide groups, thiol groups, and combinations thereof, more preferably from the group consisting of carboxyl groups, amino groups, azetidinium groups, and combinations thereof, even more preferably from the group consisting of carboxyl groups, amino groups, and combinations thereof); (2) placing the contact lens precursor in a container in a position to ensure that the concave surface of the contact lens precursor faces up whereas the convex surface faces down; (3) dosing an aqueous solution into the concave surface of the contact lens precursor in an amount for immersing completely the contact lens precursor in the aqueous solution in the container while maintaining the concave surface facing up, wherein the aqueous solution has a room temperature and comprises at least one hydrophilic polymeric material, wherein said at least one hydrophilic polymeric material comprises second reactive functional groups each of which is capable of reacting with one first reactive functional group at a temperature above the room temperature to form a covalent linkage, wherein the second reactive functional groups are selected from the group consisting of carboxyl groups, amino groups, azetidinium groups, epoxide groups, aziridine groups, thiol groups, and combinations thereof (preferably from the group consisting of carboxyl groups, amino groups, azetidinium groups, epoxide groups, thiol groups, and combinations thereof, more preferably from the group consisting of carboxyl groups, amino groups, azetidinium groups, and combinations thereof); and (4) increasing the temperature of the aqueous solution with the contact lens precursor therein to a temperature of from about 35° C. to about 140° C. to form a coated contact lens which is a contact lens of the invention described in the previous aspect of the invention.

In accordance with all the various aspects of the invention, the lens bulk material of a contact lens of the invention can be derived directly from a preformed contact lens. A preformed contact lens can be any contact lens which has not been subjected to any surface treatment after being produced according to any lens manufacturing processes, any contact lens which has been plasma treated or treated with any chemical or physical surface modification, or any commercial contact lens, so long as it does not have a hydrogel coating on the surface of the preformed contact lens. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a lens formulation) typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387,759. Reusable molds can be made of quartz, glass, sapphire, $CaF_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hard contact lens comprising a hard plastic material as lens bulk material. Preferably, the hard plastic material is a crosslinked polymethylacrylate. A person skilled in the art knows well how to make a hard plastic material, including a crosslinked polymethylmethacrylate.

In another preferred embodiment, a preformed contact lens is a rigid gas permeable contact lens. A person skilled in the art knows how to make a rigid gas permeable contact lens.

In another preferred embodiment, a preformed contact lens is a hybrid contact lens having a central optical zone made of a rigid gas permeable lens material and surrounded by a peripheral zone made of a hydrogel material.

In another preferred embodiment, a preformed contact lens is a non-silicone hydrogel contact lens (or so-called a conventional hydrogel contact lens).

Preformed non-silicone hydrogel contact lenses can be any commercially-available non-silicone hydrogel contact lenses or can be produced according to any known methods.

For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Preferred examples of water-soluble prepolymers include without limitation: a water-soluble crosslinkable poly(vinyl alcohol) prepolymer described in U.S. Pat. Nos. 5,583,163 and 6,303,687

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the inner layer is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol. The mole percentages of repeating units can be calculated based on a non-silicone hydrogel lens formulation for making the non-silicone hydrogel contact lens.

In another preferred embodiment, a preformed contact lens is a silicone hydrogel contact lens.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a polysiloxane vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (I), are described later in this application and can be prepared according to the procedures disclosed in U.S. patent Ser. No. 10/081,697.

Another class of preferred polysiloxane vinylic crosslinkers are vinylic crosslinkers of formula (I), which are described later in this application and can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyanatoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxyl-terminated polydisiloxane in the presence of a diisocyanate or di-epoxy coupling agent.

Other classes of preferred polysiloxane vinylic crosslinkers are chain-extended polysiloxane vinylic crosslinkers of any one of formula (2) to (7), which are described later in this application and can be prepared according to the procedures described in U.S. Pat. Nos. 5,034,461, 5,416,132, 5,449,729, 5,760,100, 7,423,074, 8,529,057, 8,835,525, 8,993,651, and 10,301,451 and in U.S. Pat. App. Pub. No. 2018-0100038 A1.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173@ and Darocur 2959@, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329.

A SiHy contact lens formulation can also comprise other necessary components known to a person skilled in the art, such as, for example, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

In accordance with the invention, a lens formulation can be introduced (dispensed) into a cavity formed by a mold according to any known methods.

After the lens formulation is dispensed into the mold, it is polymerized to produce a contact lens. Polymerization may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

In accordance with the invention, the silicone hydrogel material of the lens bulk material has an oxygen permeability of from about 50 (preferably about 60, more preferably about 70, even more preferably about 90 barrers, most preferably at least about 100 barrers) to about 180 barrers. The silicone hydrogel material can also have an equilibrium water content of from about 10% (preferably about 20%, more preferably 30%; even more preferably about 40%) to about 80% by weight. The silicone hydrogel material can further have a bulk elastic modulus (i.e., bulk Young Modulus) of from about 0.3 MPa to about 1.8 MPa, preferably from 0.4 MPa to about 1.5 MPa, more preferably from about 0.4 MPa to about 1.2 MPa. The oxygen permeability, elastic modulus and water content of the silicone hydrogel material of a contact lens of the invention can be determined by measuring the oxygen permeability, the elastic modulus and water content of the preformed contact lens. A person skilled in the art knows well how to determine the elastic modulus and equilibrium water content of a silicone hydrogel material or a SiHy contact lens. For example, all commercial SiHy contact lenses have reported values of oxygen permeability, elastic modulus and water content.

The outer posterior surface hydrogel layer of a contact lens of the invention preferably is thicker than the outer anterior surface hydrogel layer. The thickness ratio of the outer posterior surface hydrogel layer over the outer anterior surface hydrogel layer is at least about 1.2, preferably at least about 1.3, more preferably at least about 1.4, even more preferably preferably at least about 1.5.

In various preferred embodiment, the outer anterior and posterior surface hydrogel layers and the outer surface hydrogel layer independent of each other are a crosslinked polymeric material which comprises various different polymer chains with different compositions, as described later in this application.

In accordance with a preferred embodiment, the outer anterior and posterior surface hydrogel layers of a contact lens of the invention independent of each other comprise an equilibrium water content of at least 80% by weight, preferably at least 85% by weight, more preferably at least about 90% by weight, even more preferably at least 95% by weight.

In accordance with the invention, each of the outer anterior and posterior surface hydrogel layers is substantially free of silicone, preferably totally free of silicone. However, it is well known that when X-ray photoelectron spectroscopy (XPS) is used to establish the presence or absence of silicon in the outer surface hydrogel layer (generally a probing depth of from 1.5 to 6 nm), samples are inevitably contaminated by the environmental silicon, as shown by the detection by XPS of silicon on the surface of samples which are theoretically free of any silicon atom, such as, for example, a polyethylene sheet from Goodfellow (1.3±0.2%), a DAILIES® AquaComfortPlus™ contact lens from Alcon (1.7±0.9%) or an ACUVUE® Moist from Johnson & Johnson (2.8±0.9%). As such, each outer surface hydrogel layer of a SiHy contact lens of the invention is substantially free of silicon, as characterized by having a silicon atomic percentage of about 5% or less, preferably about 4% or less, even more preferably about 3% or less, of total elemental percentage, as measured by XPS analysis of the contact lens in dried state.

The layered structure configuration of a contact lens of the invention can be established by analysis with atomic force microscopy (AFM), environmental scanning electron microscopy, confocal fluorescence microscopy, or any other known techniques of a cross section of a contact lens in fully hydrated state (i.e., directly in water or a buffered saline) as known to a person skilled in the art.

In any one of the preferred embodiments described above of the various aspects of the invention, a contact lens of the invention has a UVB transmittance of about 10% or less (preferably about 5% or less, more preferably about 2.5% or less, even more preferably about 1% or less) between 280 and 315 nanometers, a UVA transmittance of about 30% or less (preferably about 20% or less, more preferably about 10% or less, even more preferably about 5% or less) between 315 and 380 nanometers, and a Violet transmittance of from 0% to about 70%, preferably from 5% to about 60%, more preferably from 5% to about 50%, even more preferably from about 5% to about 40% between 380 nm and 440 nm.

A contact lens of the invention can be obtained according to any method known to a person skilled in the art or to be developed.

In accordance with the invention, a contact lens precursor is a preformed contact lens that either inherently comprises or has been modified to comprise first reactive functional groups on and/or near its surface.

Where a preformed contact lens inherently comprises first reactive functional groups on and/or near its surfaces, it is obtained by polymerizing a polymerizable composition (i.e., a non-silicone hydrogel lens formulation or a silicone hydrogel lens formulation) comprising a vinylic monomer which further comprises at least one first reactive functional group, e.g., selected from the group consisting of carboxyl group, amino group, azetidinium group, epoxide group, aziridine group, and combinations thereof. Examples of carboxyl-containing vinylic monomers, amino-containing vinylic monomers, azetidinium-containing vinylic monomers, epoxy-containing vinylic monomers, and aziridine-containing vinylic monomers are known in the art and can be obtained from commercial sources or prepared according to known procedures. The lens formulation comprises preferably from about 0.1% to about 10%, more preferably from about 0.25% to about 7%, even more preferably from about 0.5% to about 5%, most preferably from about 0.75% to about 3%, by weight of such a vinylic monomer having at least one first reactive functional group.

Where a preformed contact lens inherently comprises amino groups on and/or near its surfaces, it can be modified chemically by reacting it with a divinylsulfone compound according to Thiol Michael Addition reaction to covalently attach vinylsulfone groups through the amino groups, or by reacting it with a thiolactone to covalently attach thiol groups through the amino groups.

Examples of preferred divinylsulfone compounds include without limitation divinylsulfone, bis(vinylsulfonyl) $C_1$-$C_6$ alkane, 1,3-bis(vinylsulfonyl)-2-propanol, 1,1-bis(vinylsulfonyl)-1-propanol, 1,5-bis(vinylsulfonyl)-3-pentanol, 1,1-bis(vinylsulfonyl)-3-methoxypropane, 1,5-bis(vinylsulfonyl)-2,4-dimethylbenzene, and 1,4-bis(vinylsulfonyl)-2,3,5,6-tetrafluorobenzene.

Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxybutyryl homocysteine thilactone (or 4-oxo-4-[(tetrahydro-2-oxo-3-thienyl)amino]-butanoic acid).

A preformed contact lens can also be subjected either to a surface treatment to have first reactive functional groups on and/or near its surfaces. Any suitable surface treatments can be used in the invention. Examples of surface treatments include: without limitation, plasma treatments; chemical treatments; chemical vapor depositions; the grafting (covalently attaching) of compounds having at least one reactive functional groups onto the surface (modified or unmodified) of an article; the graft-polymerization of vinylic monomers having at least one first reactive functional group onto the surface (modified or unmodified) of an article; layer-by-layer ("LbL") deposition of one or more hydrophilic materials having first reactive functional groups on the surface (modified or unmodified) of an article (i.e., a process for forming an LbL coating); covalently attachment of one or more hydrophilic polymeric materials having first reactive functional groups onto the surface (modified or unmodified) of an article; or combinations thereof.

A plasma treatment refers to a process in which a contact lens is exposed to a plasma to chemically modify the surface of the contact lens. The term "plasma" denotes an ionized gas (e.g., created by electric glow discharge which may be composed of electrons, ions of either polarity, gas atoms and molecules in the ground or any higher state of any form of excitation, as well as of photons). The excited species interact with solid surfaces of an article placed in the plasma, resulting in the chemical and physical modification of the material surface. Where a plasma is generated by subjecting a gas in a vacuum chamber to an electric charge typically at radio frequency (rf) (or at a microwave or other frequency), it is often called "low temperature plasma". Where a plasma is generated by an atmospheric discharge (e.g., arc discharge) and sustained at a surrounding atmospheric pressure, it is a "high temperature plasma" or "atmospheric plasma". An atmospheric plasma can be produced by atmospheric pressure discharges.

For a review of plasma treatment and its uses reference is made to R. Hartmann "Plasma polymerisation: Grundlagen, Technik und Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY® and AIR OPTIX® (Alcon), and PUREVISION® (Bausch & Lomb). Advantages of a plasma coating, such as, e.g., those may be found with Focus NIGHT & DAY®, are its durability, relatively high hydrophilicity/wettability), and low susceptibility to lipid and protein deposition and adsorption. Examples of plasma treatment are those disclosed in U.S. Pat. Nos. 4,143,949; 4,312,575; 5,464,667, 6,881,269; and 7,078,074 (herein incorporated by references in their entireties). It is understood that a preformed contact lenses must typically be dried before a plasma treatment under low pressure.

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency).

As an illustrated example of plasma treatment under low pressure of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Low pressure plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch low-pressure-plasma treatment system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear low-pressure-plasma system.

In accordance with the invention, the preformed contact lens in a dried state is treated with a low-pressure plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably $CO_2$ or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

Atmospheric plasma surface treatment disclosed in U.S. Pat. No. 9,156,213 (herein incorporated by reference in its entirety) is preferably used in the invention. For the atmospheric plasma surface treatment, contact lenses can be in a fully hydrated state.

A person skilled in the art knows well how to graft (covalently attach) a compound having at least one first reactive functional group (carboxyl group, amino group, azetidinium group, epoxide group, aziridine group, vinylsulfone group, thiol group, and combinations thereof) onto a surface of a contact lens according to known coupling reactions.

"LbL coating", as used herein, refers to a coating that is not covalently attached to the polymer matrix of a contact lens and is obtained through a layer-by-layer ("LbL") deposition of one or more polymeric materials on the lens. An LbL coating can be composed of one or more layers. LbL coatings on contact lenses can be obtained according to methods described in U.S. Pat. Nos. 6,451,871, 6,719,929, 6,793,973, 6,811,805, 6,896,926, 8,044,112, 8,158,192, and 8,147,897. Preferably, an LbL coating comprises at least one layer of one or more polyanionic polymers each comprising carboxyl groups and optionally polyanionic polymers chemically modified to contain first reactive functional groups other than carboxyl groups. The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer which is polyacrylic acid, polymethacrylic acid, poly(acrylic acid-co-methacrylic acid), or a mixture thereof. A person knows well to chemically modify a polyanionic polymer by reacting it with a compound having at least one first reactive functional group other than carboxyl group.

An LbL coating of a polyanionic polymer having carboxyl groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polyanionic polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a contact lens so that a portion of the reactive polymer may penetrate into the contact lens and increase the durability of the coating. Examples of organic solvents are described above. The pH of the polyanionic polymer solution is preferably from about 1.5 to about 4.0 to form a relatively-thick and stable LbL coating. The temperature of the coating solution is preferably from about 20° C. to about 70° C.

A person skilled in the art knows how to covalently attach one or more polymers having first reactive functional groups onto the surface of a contact lens. Exemplary methods for covalently attaching one or more hydrophilic polymers onto a medical device are disclosed in U.S. Pat. Nos. 5,599,576, 5,766,158, 6,087,415, 6,096,726, 6,340,465, 6,440,571, 6,500,481, 6,534,559, 6,623,747, 6,683,062, 6,838,491, 6,866,936, 6,923,978, and 8,529,057 and in U.S. Pat. Appl. Pub. Nos. 2009-0145086A1, 2009-0145091A1, 2008-0142038A1, and 2007-0122540A1.

Graft-polymerization of one more vinylic monomers having at least one first reactive functional group (e.g., carboxyl, amino, azetidinium group, epoxide group, aziridine group, and combinations thereof) in the presence or absence of a vinylic crosslinking agent to form a hydrophilic polymer coating are described in numerous patents, for example, in U.S. Pat. Nos. 6,099,122, 6,436,481, 6,440,571, 6,447,920, 6,465,056, 6,521,352, 6,586,038, 6,730,366, 6,734,321, 6,835,410, and 6,878,399 and in JP2001075060. For example, a preformed contact lens in dry state is first subjected to a plasma treatment in a plasma atmosphere of a compound having at least one reactive functional group (e.g., a vinylic monomer having a primary or secondary amino group, a carboxyl group, an epoxy group, an azlactone group, an aziridine group, or an isocyanate group) to form a plasma coating having reactive functional groups. The plasma-treated contact lens is reacted with a compound having a free-radical initiator moiety (e.g., a thermal initiator or a photoinitiator) or preferably a living polymerization initiator moiety (e.g., an atom transfer radical polymerization (ATRP) initiator or a reversible addition fragmentation chain transfer polymerization (RAFT) initiator) and a functional group co-reactive with the functional groups of the plasma coating on the contact lens in the presence or absence of a coupling agent under coupling reaction conditions known to a person skilled in the art. The obtained contact lens with free-radical initiator moieties thereon is immersed in a solution of one or more vinylic monomers having at least one first functional group and subject to conditions to initiate free radical polymerization of those vinylic monomers so as to form a layer of a graft-from polymer comprising first reactive functional groups.

In accordance with the invention, the hydrophilic polymeric material for forming the outer surface hydrogel layer or the outer anterior and posterior surface hydrogel layers (i.e., the crosslinked hydrophilic coating) comprises second reactive functional groups. Preferably, the hydrophilic polymeric material is a highly-branched hydrophilic polymeric material that comprises a three-dimensional network (i.e., polymer chains crosslinked by a limited amount of one or more crosslinkers so that the highly-branched hydrophilic polymeric material is soluble or dispersible in water) and second reactive functional groups.

One example of such a highly-branched hydrophilic polymeric material is a partial reaction product of at least one azetidinium-containing polymer having azetidinium groups with at least one hydrophilic polymer having carboxyl, primary amine, secondary amine, or thiol groups, according to the crosslinking reactions shown in Scheme I Scheme I

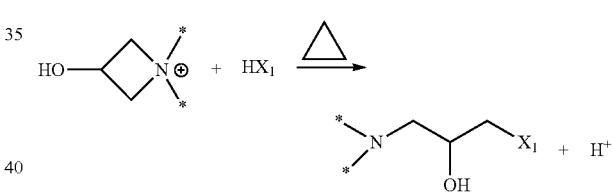

in which $X_1$ is —S—*, —OC(=O)—*, or —NR'—* in which R' is hydrogen or a $C_1$-$C_{20}$ unsubstituted or substituted alkyl group, and * represents an organic radical. The resultant highly-branched hydrophilic polymer comprise azetidinium groups and optionally carboxyl, primary amine, secondary amine, thiol groups, or combinations thereof.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931. A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1.

Homopolymers and copolymers of an azetidinium-containing vinylic monomer can be obtained according to the procedures described in U.S. Pat. Appl. Pub. No. 2013/0337160A1.

Any suitable hydrophilic polymers can be used in the invention so long as they are ophthalmically compatible and contain at least one amino group, at least one carboxyl group, and/or at least one thiol group, preferably contain at least one carboxyl group, at least one thiol group, or combinations thereof.

Hydrophilic polymeric materials comprising azetidinium groups can be prepared according to the processes disclosed in U.S. Pat. Appli. Pub. Nos. US 2016/0061995 A1 and US2013/0337160 A1 and in U.S. Pat. No. 8,529,057.

Another example of such a highly-branched hydrophilic polymeric material is a partial reaction product of at least one polymer having epoxy groups with at least one hydrophilic polymer having carboxyl, primary amine, secondary amine, or thiol groups, according to the known coupling reactions. The resultant highly-branched hydrophilic polymer comprise epoxy groups and optionally carboxyl, primary amine, secondary amine, thiol groups, or combinations thereof. For example, a multiarmed polyethylene glycol with terminal epoxy groups can be partially reacted with a multiarmed polyethylene glycol with terminal thiol groups (or carboxyl or amino groups). Alternatively, a copolymer of an epoxy-containing vinylic monomer (i.e., a vinylic monomer having an epoxy group) with one or more hydrophilic vinylic monomer can be reacted with a hydrophilic polymer having thiol, carboxyl or amino groups. Such hydrophilic polymeric materials can be prepared according to the processes disclosed in U.S. Pat. No. 9,244,195.

Another example of such a highly-branched hydrophilic polymeric material is a partial reaction product of at least one polymer having aziridine groups (or azlactone groups) with at least one hydrophilic polymer having carboxyl, primary amine, secondary amine, or thiol groups, according to the known coupling reactions. The resultant highly-branched hydrophilic polymer comprise aziridine groups (or azlactone groups) and optionally carboxyl, primary amine, secondary amine, thiol groups, or combinations thereof. Examples of hydrophilic polymers comprising aziridine groups or azlactone groups includes copolymers of aziridine-containing vinylic monomers (i.e. a vinylic monomer having an aziridine group) or azlactone-containing vinylic monomer (i.e., a vinylic monomer having an azlactone group) with one or more hydrophilic vinylic monomers.

Another example of such a highly-branched hydrophilic polymeric material are partial reaction products of at least one polymer having vinylsulfone groups with at least one hydrophilic polymer having thiol groups, according to the known Michael Addition reactions. The resultant highly-branched hydrophilic polymer comprise vinylsulfone groups and/or thiol groups. Examples of hydrophilic polymers comprising vinylsulfone groups includes multiarmed polyethylene glycols having terminal sulfone groups, a polymer comprising monomeric units each having a thiol group and obtained by reacting a thiolactone with monomeric units each having an amino group (i.e., derived from an amino-containing vinylic monomers).

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In accordance with the invention, the preformed contact lens with the first reactive functional groups thereon is heated in an aqueous solution which comprises a hydrophilic polymeric material having the second reactive functional groups, at a temperature of from about 40° C. to about 140° C. for a time period to crosslink the hydrophilic polymeric material while covalently attaching the crosslinked hydrophilic polymeric material onto the preformed contact lens so as to form a hydrogel coating on the surface of the preformed contact lens.

Preferably, where the first reactive functional groups are not vinylsulfone groups, the step of heating is performed by autoclaving the preformed contact lens with the first reactive functional groups thereon immersed in the aqueous solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups (or epoxy, aziridine or azlactone groups) which do not participate in crosslinking reaction may be hydrolyzed into 2,3-dihydroxypropyl (HO—$CH_2$—CH(OH)—$CH_2$—) groups (or hydroxyl, amino, or carboxyl groups) and that the azetidinium-containing polymeric material (or epoxy-, aziridine- or azlactone-containing polymeric material) present in the lens packaging solution, if applicable, can be converted to a non-reactive polymeric wetting agent capable of improving a lens's insert comfort. Consequently, the packaging solution is ophthalmically safe after autoclave.

Lens packages (or containers) are well known to a person skilled in the art for autoclaving and storing a contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (i.e., 2-amino-2-hydroxymethyl-1,3-propanediol), Bis-Tris [i.e., Bis-(2-hydroxyethyl)-imino-tris-(hydroxymethyl)-methane], Bis-Tris propane [i.e., 1,3-bis(tris(hydroxymethyl)methylamino)propane], bis-aminopolyols, triethanolamine, ACES [i.e., N-(2-hydroxyethyl)-2-aminoethanesulfonic acid], BES [i.e., N,N-Bis(2-hydroxyethyl)-2-aminoethanesulfonic acid], HEPES [i.e., 4-(2-hydroxyethyl)-1-piperazineethanesulfonic acid], MES [i.e., 2-(N-morpholino)ethanesulfonic acid], MOPS [i.e., 3-[N-morpholino]-propanesulfonic acid], PIPES [i.e., piperazine-N,N'-bis(2-ethanesulfonic acid], TES {i.e., N-[Tris(hydroxymethyl)methyl]-2-aminoethanesulfonic acid}, salts thereof, phosphate buffers, e.g. $Na_2HPO_4$, $NaH_2PO_4$, and $KH_2PO_4$ or mixtures thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitol, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a hydrophilic polymeric material having second reactive functional groups.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A contact lens, comprising a lens bulk material covered with an outer surface hydrogel layer and having a posterior surface and an opposite anterior surface, wherein the outer surface hydrogel layer consists of an anterior outer hydrogel layer and a posterior outer hydrogel layer, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.2, wherein $(Id)_{PS}$ is the indentation depth measured with a indenting probe having a tip radius of 9.5 μm and a stiffness of 0.54 N/m at 5 KPa compression pressure against the posterior surface in a nanoindentation test, wherein $(Id)_{AS}$ is the indentation depth measured with a indenting probe having a tip radius of 9.5 μm and a stiffness of 0.54 N/m at 5 KPa compression pressure against the anterior surface in a nanoindentation test.

2. The contact lens of embodiment 1, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.3.

3. The contact lens of embodiment 1, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.4.

4. The contact lens of embodiment 1, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.5.

5. The contact lens of embodiment 1, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.6.

6. The contact lens of any one of embodiments 1 to 5, wherein the contact lens has a water-break-up time of at least 10 seconds.

7. The contact lens of any one of embodiments 1 to 5, wherein the contact lens has a water-break-up time of at least 12.5 seconds.

8. The contact lens of any one of embodiments 1 to 5, wherein the contact lens has a water-break-up time of at least 15 seconds.
9. The contact lens of any one of embodiments 1 to 5, wherein the contact lens has a water-break-up time of at least 17.5 seconds.
10. The contact lens of any one of embodiments 1 to 5, wherein the contact lens has a water-break-up time of at least 20 seconds.
11. The contact lens of any one of embodiments 1 to 11, wherein the lens bulk material is a preformed hard contact lens essentially made of a hard plastic material.
12. The contact lens of embodiment 11, wherein the hard plastic material is a crosslinked polymethacrylate.
13. The contact lens of any one of embodiments 1 to 11, wherein the lens bulk material is a preformed rigid gas permeable contact lens essentially made of a rigid gas permeable lens material.
14. The contact lens according to any one of embodiments 11 to 13, wherein the outer anterior and posterior surface hydrogel layers independent of each another have a thickness of from about 0.2 μm to about 20 μm when being fully hydrated.
15. The contact lens according to any one of embodiments 11 to 13, wherein the anterior and posterior outer hydrogel layers independent of each another have a thickness of from about 0.3 μm to about 15 μm when being fully hydrated.
16. The contact lens according to any one of embodiments 11 to 13, wherein the anterior and posterior outer hydrogel layers independent of each another have a thickness of from about 0.4 μm to about 10 μm when being fully hydrated.
17. The contact lens according to any one of embodiments 11 to 13, wherein the anterior and posterior outer hydrogel layers independent of each another have a thickness of from about 0.5 μm to about 8 μm when being fully hydrated.
18. The contact lens according to any one of embodiments 1 to 10, wherein the lens bulk material is a preformed hybrid contact lens which has a central optical zone essentially made of a rigid gas permeable lens material and surrounded by a peripheral zone essential made of a non-silicone hydrogel material.
19. The contact lens according to any one of embodiments 1 to 10, wherein the lens bulk material is a preformed embedded contact lens, wherein the lens bulk material consists essentially of a 3-dimensional article and a non-silicone hydrogel material, wherein the 3-dimensional article is made of a non-hydrogel material and has a 3-dimensional size smaller than that of the contact lens so that the 3-dimensional article is completely embedded within the non-silicone hydrogel material.
20. The contact lens according to any one of embodiments 1 to 10, wherein the lens bulk material is a preformed non-silicon hydrogel contact lens essentially made of a non-silicone hydrogel material.
21. The contact lens of any one of embodiments 18 to 20, wherein the non-silicon hydrogel material comprises at least 50% by mole of repeating units of at least one hydroxyl-containing vinylic monomer.
22. The contact lens of embodiment 21, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.
23. The contact lens of embodiment 21, wherein said at least one hydroxyl-containing vinylic monomer is selected from the group consisting of hydroxyethyl (meth)acrylate, glycerol (meth)acrylate, and vinyl alcohol.
24. The contact lens of any one of embodiments 18 to 23, wherein the non-silicone hydrogel material has an equilibrium water content of from about 10% to 80% by weight.
25. The contact lens according to any one of embodiments 18 to 24, wherein the outer anterior and posterior surface hydrogel layers independent of each another have a thickness of from about 0.05 μm to about 20 μm when being fully hydrated.
26. The contact lens according to any one of embodiments 18 to 24, wherein the outer anterior and posterior surface hydrogel layers independent of each another have a thickness of from about 0.1 μm to about 15 μm when being fully hydrated.
27. The contact lens according to any one of embodiments 18 to 24, wherein the outer anterior and posterior surface hydrogel layers independent of each another have a thickness of from about 0.2 μm to about 10 μm when being fully hydrated.
28. The contact lens according to any one of embodiments 18 to 24, wherein the outer anterior and posterior surface hydrogel layers independent of each another have a thickness of from about 0.3 μm to about 6 μm when being fully hydrated.
29. The contact lens according to any one of embodiments 1 to 10, wherein the lens bulk material is a preformed hybrid contact lens which has a central optical zone essentially made of a rigid gas permeable lens material and surrounded by a peripheral zone essential made of a silicone hydrogel material.
30. The contact lens according to any one of embodiments 1 to 10, wherein the lens bulk material is a preformed embedded contact lens, wherein the lens bulk material consists essentially of a 3-dimensional article and a silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material.
31. The contact lens according to any one of embodiments 1 to 10, wherein the lens bulk material is a preformed non-silicon hydrogel contact lens essentially made of a silicone hydrogel material.
32. The contact lens according to any one of embodiments 29 to 31, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.
33. The contact lens of embodiment 32, wherein said at least one silicone-containing vinylic monomer comprises a vinylic monomer of formula (M1) or (M2)

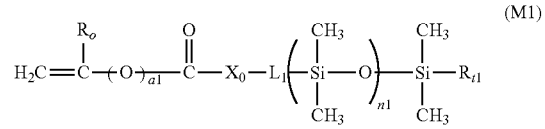

-continued (M2)

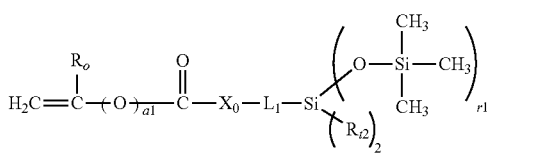

in which: a1 is zero or 1; $R_o$ is H or methyl; $X_o$ is O or $NR_1$; $L_1$ is a $C_2$-$C_8$ alkylene divalent radical or a divalent radical of

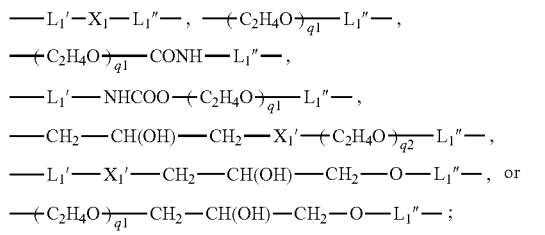

$L_1'$ is $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_0$ alkyl; $X_1'$ is O or $NR_1$; q1 is an integer of 1 to 30; q2 is an integer of 0 to 30; n1 is an integer of 3 to 40; and r1 is an integer of 2 or 3.

34. The contact lens of embodiment 32 or 33, wherein said at least one silicone-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsiloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

35. The contact lens of any one of embodiments 32 to 34, wherein said at least one silicone-containing vinylic monomer comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy) dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

36. The contact lens of any one of embodiments 29 to 35, wherein the silicone hydrogel material comprises repeating units of at least one polysiloxane vinylic crosslinker.

37. The contact lens of embodiment 36, wherein said at least one polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

38. The contact lens of embodiment 36, wherein said at least one polysiloxane vinylic crosslinker comprises a vinylic crosslinker of formula (I)

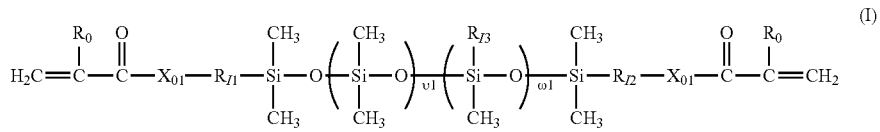

(I)

in which:
υ1 is an integer of from 30 to 500 and ω1 is an integer of from 1 to 75, provided that
ω1/υ1 is from about 0.035 to about 0.15 (preferably from about 0.040 to about 0.12, even more preferably from about 0.045 to about 0.10);
$X_{01}$ is O or $NR_N$ in which $R_N$ is hydrogen or $C_1$-$C_{10}$-alkyl;
$R_o$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
$R_{I3}$ is a monovalent radical of any one of formula (Ia) to (Ie)

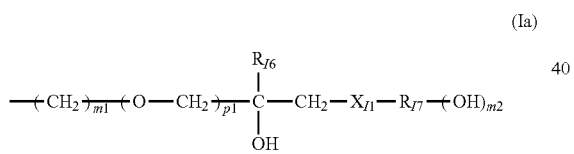
(Ia)

(Ib)

(Ic)

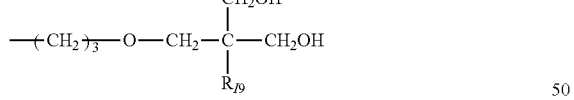
(Id)

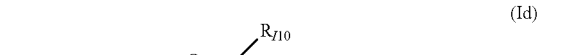

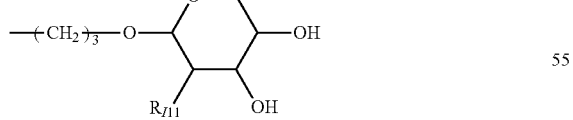
(Ie)

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

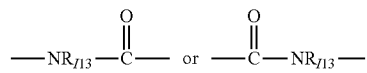

in which $R_{I13}$ is hydrogen or $C_1$-$C_{10}$ alkyl.

39. The contact lens of embodiment 36, wherein said at least one polysiloxane vinylic crosslinker comprises a vinylic crosslinker of any one of formula (1) to (7)

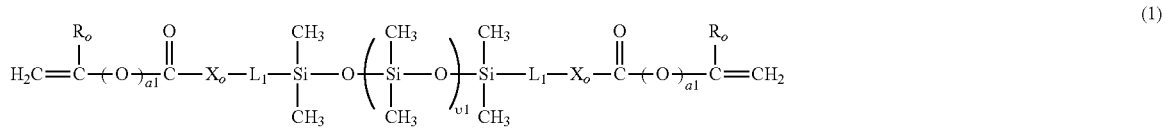

(1)

-continued

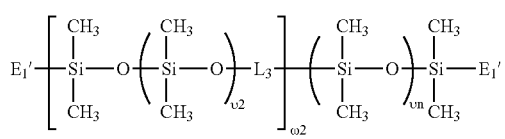
(2)

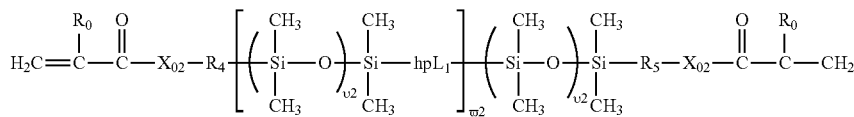
(3)

(4)
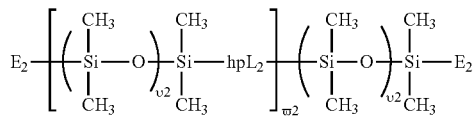

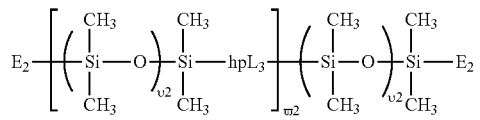
(5)

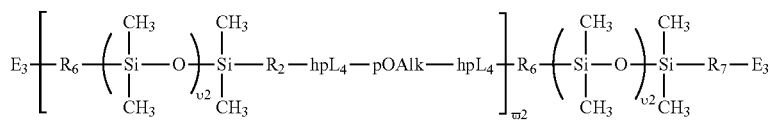
(6)

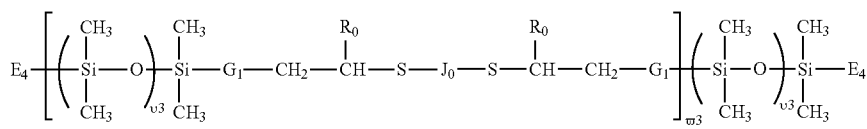
(7)

in which:

υ1 is an integer of from 30 to 500;
υ2 is an integer of from 5 to 50;
υ3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)≥1;
$R_o$ is H or methyl; $R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_8$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical; $R_8$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;

$X_o$, $X_1'$, $X_{o1}$, $X_{o2}$, and $X_{o3}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_{n5}$—; $X_{o6}$ is a direct bond, a $C_1$-$C_6$ alkylene divalent radical, a $C_1$-$C_6$ alkylenoxy divalent radical, —COO—, or —$CONR_{n5}$—;
$X_{o8}$ is a direct bond or —COO—; $X_{o9}$ is O or $NR_{n5}$; $X_{10}$ is a direct bond, a $C_1$-$C_6$ alkylene divalent radical, —COO—, or —$CONR_{n5}$—;
$E_1'$ is a monovalent radical of

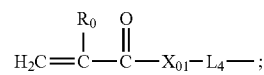

$E_2$ is a monovalent radical of

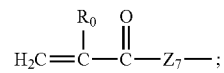

$E_3$ is a monovalent radical of

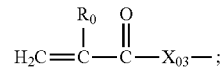

$E_4$ is a monovalent radical of

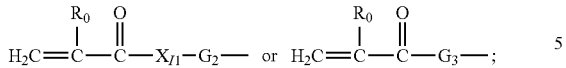

$L_1$ is a $C_2$-$C_8$ alkylene divalent radical or a divalent radical of

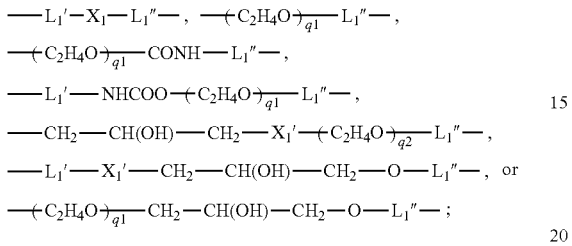

$L_1'$ is a $C_2$-$C_8$ alkylene divalent radical which has zero or one hydroxyl group;
$L_1''$ is $C_3$-$C_8$ alkylene divalent radical which has zero or one hydroxyl group;
$L_3$ is a divalent radical of

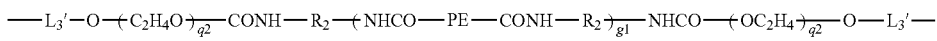

in which PE is a divalent radical of

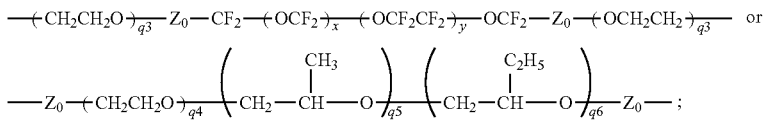

$L_3'$ is $C_3$-$C_8$ alkylene divalent radical;
$L_4$ is a divalent radical of

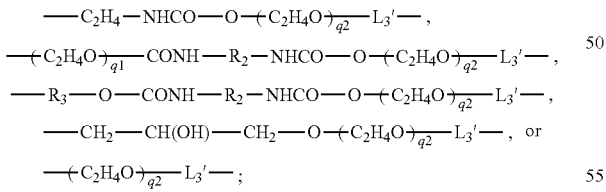

$hpL_1$ is a divalent radical of

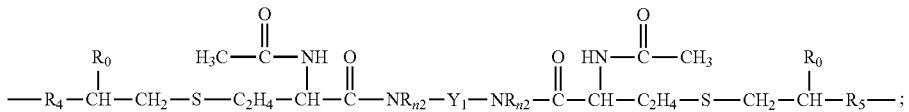

hpL$_2$ is a divalent radical of

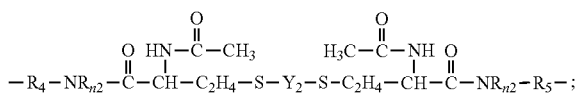

hpL$_3$ is a divalent radical of

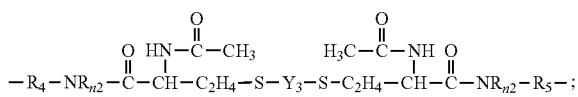

hpL$_4$ is a divalent radical of

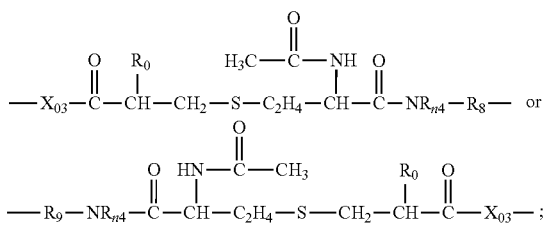

pOAlk is a divalent radical of

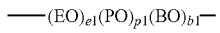

in which EO is an oxyethylene unit (—CH$_2$CH$_2$O—), PO is an oxypropylene unit

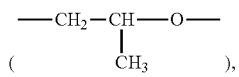

and BO is an oxybutylene unit

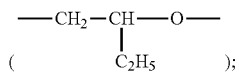

M$_0$ is C$_3$-C$_8$ alkylene divalent radical;
M$_1$ is a C$_4$-C$_{14}$ hydrocarbon divalent radical;
M$_2$ and M$_3$ independent of each other are a C$_1$-C$_6$ alkylene divalent radical;
J$_0$ is a C$_1$-C$_{12}$ hydrocarbon radical having 0 to 2 hydroxyl or carboxyl groups;
G1 is a direct bond, a C$_1$-C$_4$ alkylene divalent radical, or a bivalent radical of

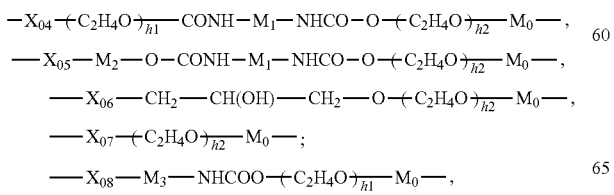

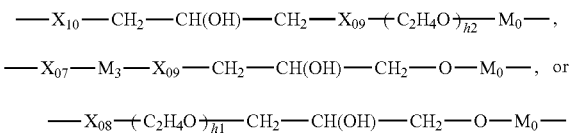

in which M$_o$ is linked to Si atom while X$_{04}$ to X$_{10}$ are linked to the group of —CH$_2$— in formula (7) and at least one of J$_0$ and G1 in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof; G$_2$ is a C$_1$-C$_4$ alkylene divalent radical or a bivalent radical of

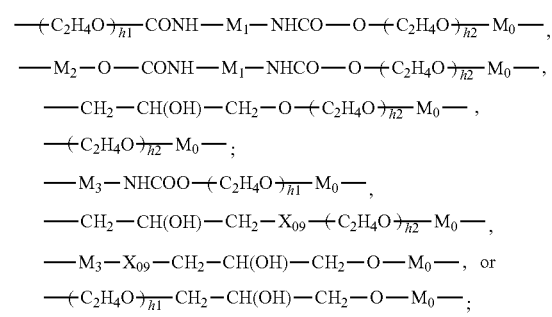

G$_3$ is a divalent radical of

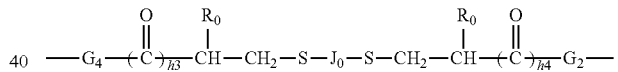

h3 and h4 independent of each other are 1 or 0;
G4 is a divalent radical of any one of (a) —NR$_3$'— in which R$_3$' is hydrogen or C$_1$-C$_3$ alkyl, (b)

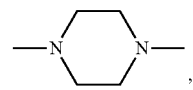

(c) —NR$_0$-G$_5$-NR$_0$— in which G$_5$ is a C$_1$-C$_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G$_6$-O— in which G$_6$ is a C$_1$-C$_6$ alkylene divalent radical, a divalent radical of

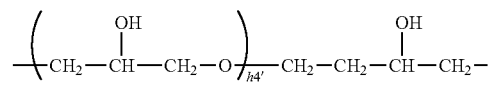

in which h4' is 1 or 2, a divalent radical of

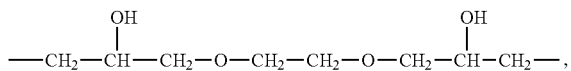

a divalent radical of

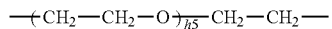

in which h5 is an integer of 1 to 5, a divalent radical of

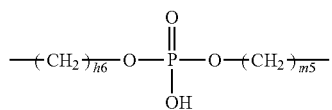

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

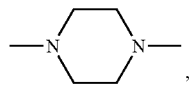

or a divalent radical of

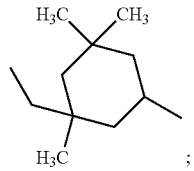

$Y_2$ is a divalent radical of

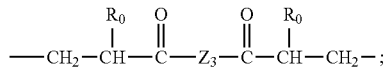

$Y_3$ is a divalent radical of

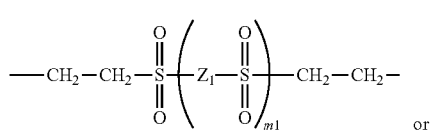

or

-continued

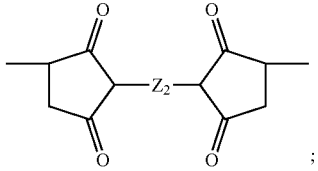

$Z_0$ is a direct bond or a $C_1$-$C_{12}$ alkylene divalent radical;

$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical, $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_0$ alkylene divalent radical, or a substituted or unsubstituted phenylene divalent radical, $Z_3$ is a divalent radical of any one of (a) —$NR_{n3}$—, (b)

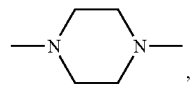

(c) —$NR_0$—$Z_5$—$NR_0$—, and (d) —O—$Z_6$—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

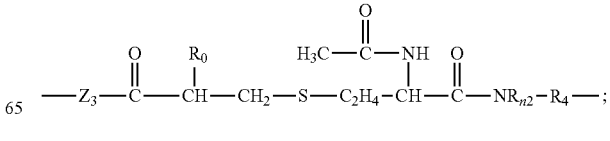

or (c) a substituted $C_3$-$C_8$ alkylene divalent radical having a hydroxyl group or phosphonyloxy group, $Z_7$ is a divalent radical of

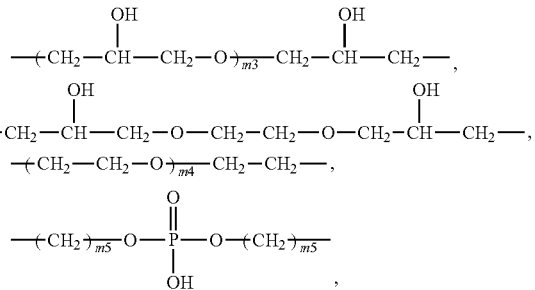

and $Z_8$ is a divalent radical of

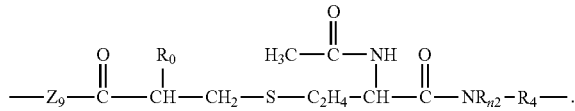

40. The contact lens of embodiment 36, wherein said at least one polysiloxane vinylic crosslinker is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

41. The contact lens of any one of embodiments 29 to 40, wherein the silicone hydrogel comprises repeating units of at least one hydrophilic vinylic monomer.

42. The contact lens of embodiment 41, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trirethylammonio)ethylphosphate, 4-[(meth)acryloylamino]butyl-2-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethyl ammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

43. The contact lens of embodiment 41 or 42, wherein said at least one hydrophilic vinylic monomer comprises N-vinylpyrrolidone, N-vinyl-N-methyl acetamide, or combinations thereof.

44. The contact lens of any one of embodiments 41 to 43, wherein said at least one hydrophilic vinylic monomer comprises N,N-dimethyl (meth)acrylamide.

45. The contact lens of any one of embodiments 41 to 44, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

46. The contact lens of any one of embodiments 29 to 45, wherein the silicone hydrogel comprises repeating units of at least one non-silicone vinylic cross-linking agent.

47. The contact lens of embodiment 46, wherein said at least one non-silicone vinylic crosslinking agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

48. The contact lens of any one of embodiments 29 to 45, wherein the silicone hydrogel comprises repeating units of at least one blending vinylic monomer.

49. The contact lens of any one of embodiments 29 to 45, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)

acrylate, hexafluoro-isopropyl (meth)acrylate, hexafluorobutyl (meth)acrylate, or combinations thereof.

50. The contact lens of any one of embodiments 29 to 45, wherein said at least one blending vinylic monomer comprises methyl methacrylate.

51. The contact lens of any one of embodiments 29 to 50, wherein the silicone hydrogel comprises repeating units of at least one UV-absorbing vinylic monomer and optionally repeating units of at least one UV/HEVL-Absorbing vinylic monomer.

52. The contact lens of any one of embodiments 29 to 51, wherein the silicone hydrogel material has an equilibrium water content of from about 10% to about 80% by weight.

53. The contact lens of any one of embodiments 29 to 51, wherein the silicone hydrogel material has an equilibrium water content of from about 20% to about 80% by weight.

54. The contact lens of any one of embodiments 29 to 51, wherein the silicone hydrogel material has an equilibrium water content of from about 30% to about 80% by weight.

55. The contact lens of any one of embodiments 29 to 51, wherein the silicone hydrogel material has an equilibrium water content of from about 40% to about 80% by weight.

56. The contact lens of any one of embodiments 29 to 55, wherein the silicone hydrogel material has an oxygen permeability of from about 50 barrers to about 180 barrers.

57. The contact lens of any one of embodiments 29 to 55, wherein the silicone hydrogel material has an oxygen permeability of from about 60 barrers to about 180 barrers.

58. The contact lens of any one of embodiments 29 to 55, wherein the silicone hydrogel material has an oxygen permeability of from about 70 barrers to about 180 barrers.

59. The contact lens of any one of embodiments 29 to 55, wherein the silicone hydrogel material has an oxygen permeability of from about 80 barrers to about 180 barrers.

60. The contact lens of any one of embodiments 29 to 55, wherein the silicone hydrogel material has an oxygen permeability of from about 90 barrers to about 180 barrers.

61. The contact lens of any one of embodiments 29 to 55, wherein the silicone hydrogel material has an oxygen permeability of from about 100 barrers to about 180 barrers.

62. The contact lens according to any one of embodiments 29 to 61, wherein the outer anterior and posterior surface hydrogel layers independent of each another have a thickness of from about 0.05 μm to about 20 μm when being fully hydrated.

63. The contact lens according to any one of embodiments 29 to 61, wherein the outer anterior and posterior surface hydrogel layers independent of each another have a thickness of from about 0.1 μm to about 15 μm when being fully hydrated.

64. The contact lens according to any one of embodiments 29 to 61, wherein the outer anterior and posterior surface hydrogel layers independent of each another have a thickness of from about 0.2 μm to about 15 μm when being fully hydrated.

65. The contact lens according to any one of embodiments 29 to 61, wherein the outer anterior and posterior surface hydrogel layers independent of each another have a thickness of from about 0.3 μm to about 10 μm when being fully hydrated.

66. The contact lens of any one of embodiments 1 to 65, wherein the outer anterior and posterior surface hydrogel layers independent of each another are a crosslinked hydrophilic polymeric material comprising polymer chains each of which includes repeating monomeric units of at least one hydrophilic vinylic monomer which comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomers having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio) ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trirethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

67. The contact lens of embodiment 66, wherein the monomeric units of said at least one hydrophilic vinylic monomer is present in each polymer chain in an amount of at least about 25% by mole.

68. The contact lens of embodiment 66, wherein the monomeric units of said at least one hydrophilic vinylic monomer is present in each polymer chain in an amount of at least about 35% by mole.

69. The contact lens of embodiment 66, wherein the monomeric units of said at least one hydrophilic vinylic monomer is present in each polymer chain in an amount of at least about 45% by mole.

70. The contact lens of embodiment 66, wherein the monomeric units of said at least one hydrophilic vinylic monomer is present in each polymer chain in an amount of at least about 55% by mole.

71. The contact lens of any one of embodiments 66 to 70, wherein said at least one hydrophilic vinylic monomer comprises the alkyl (meth)acrylamide.

72. The contact lens of embodiment 71, wherein the alkyl (meth)acrylamide is (meth)acrylamide, N,N-dimethyl (meth)acrylamide, or a combination thereof.

73. The contact lens of any one of embodiments 66 to 72, wherein said at least one hydrophilic vinylic monomer comprises the hydroxy-containing acrylic monomer.

74. The contact lens of any one of embodiments 66 to 73, wherein said at least one hydrophilic vinylic monomer comprises the carboxyl-containing acrylic monomer.

75. The contact lens of any one of embodiments 66 to 74, wherein said at least one hydrophilic vinylic monomer comprises the amino-containing acrylic monomer.

76. The contact lens of any one of embodiments 66 to 75, wherein said at least one hydrophilic vinylic monomer comprises the N-vinyl amide monomer.

77. The contact lens of embodiment 76, wherein the N-vinyl amide monomer is N-vinylpyrrolidone, N-vinyl-N-methyl acetamide, or combinations thereof.

78. The contact lens of any one of embodiments 66 to 77, wherein said at least one hydrophilic vinylic monomer comprises the methylene-containing pyrrolidone monomer.

79. The contact lens of any one of embodiments 66 to 78, wherein said at least one hydrophilic vinylic monomer comprises the acrylic monomer having a $C_1$-$C_4$ alkoxyethoxy group.

80. The contact lens of any one of embodiments 66 to 79, wherein said at least one hydrophilic vinylic monomer comprises the vinyl ether monomer.
81. The contact lens of any one of embodiments 66 to 80, wherein said at least one hydrophilic vinylic monomer comprises the allyl ether monomer.
82. The contact lens of any one of embodiments 66 to 81, wherein said at least one hydrophilic vinylic monomer comprises the phosphorylcholine-containing vinylic monomer.
83. The contact lens of embodiment 82, wherein the phosphorylcholine-containing vinylic monomer is (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, or combinations thereof.
84. The contact lens of any one of embodiments 66 to 83, wherein said at least one hydrophilic vinylic monomer comprises allyl alcohol, N-2-hydroxyethyl vinyl carbamate, N-carboxyvinyl-β-alanine (VINAL), N-carboxyvinyl-α-alanine, or combinations thereof.
85. The contact lens of any one of embodiments 1 to 65, wherein the outer anterior and posterior surface hydrogel layers independent of each another are a crosslinked hydrophilic polymeric material comprising poly(ethylene glycol) chains.
86. The contact lens of embodiment 85, wherein poly(ethylene glycol) chains are derived directly from: (1) a pol(ethylene glycol) having one sole functional group of —NH$_2$, —SH, —COOH, epoxy group, or vinylsulfone; (2) a poly(ethylene glycol) having two terminal functional groups selected from the group consisting of —NH$_2$, —COOH, —SH, epoxy group, vinylsulfone, and combinations thereof; (3) a multi-arm poly(ethylene glycol) having one or more functional groups selected from the group consisting of —NH$_2$, —COOH, —SH, epoxy group, vinylsulfone, and combinations thereof; or (4) combinations thereof.
87. The contact lens of any one of embodiments 1 to 86, wherein the outer anterior and posterior surface hydrogel layers independent of each another have an equilibrium water content of at least 80% by weight.
88. The contact lens of any one of embodiments 1 to 86, wherein the outer anterior and posterior surface hydrogel layers independent of each another have an equilibrium water content of at least 85% by weight.
89. The contact lens of any one of embodiments 1 to 86, wherein the outer anterior and posterior surface hydrogel layers independent of each another have an equilibrium water content of at least 90% by weight.
90. The contact lens of any one of embodiments 1 to 89, wherein the contact lens has a silicon atomic percentage of about 5% or less of total elemental percentage, as measured by XPS analysis of the contact lens in dried state.
91. The contact lens of any one of embodiments 1 to 89, wherein the contact lens has a silicon atomic percentage of about 4% or less of total elemental percentage, as measured by XPS analysis of the contact lens in dried state.
92. The contact lens of any one of embodiments 1 to 89, wherein the contact lens has a silicon atomic percentage of about 3% or less of total elemental percentage, as measured by XPS analysis of the contact lens in dried state.
93. A method for producing a contact lens of any one of embodiments 1 to 92, comprising the step of:
    (1) obtaining a contact lens precursor which has a concave surface and an opposite convex surface and comprises a lens bulk material of any one of embodiments 1 to 92 and first reactive functional groups on and/or near the anterior and posterior surfaces, wherein the first reactive functional groups are selected from the group consisting of carboxyl groups, amino groups, azetidinium groups, epoxide groups, aziridine groups, vinylsulfone groups, thiol groups, and combinations thereof;
    (2) placing the contact lens precursor in a container in a position to ensure that the concave surface of the contact lens precursor faces up whereas the convex surface faces down;
    (3) dosing an aqueous solution into the concave surface of the contact lens precursor in an amount for immersing completely the contact lens precursor in the aqueous solution in the container while maintaining the concave surface facing up, wherein the aqueous solution has a room temperature and comprises at least one hydrophilic polymeric material, wherein said at least one hydrophilic polymeric material comprises second reactive functional groups each of which is capable of reacting with one first reactive functional group at a temperature above the room temperature to form a covalent linkage, wherein the second reactive functional groups are selected from the group consisting of carboxyl groups, amino groups, azetidinium groups, epoxide groups, aziridine groups, thiol groups, and combinations thereof; and
    (4) increasing the temperature of the aqueous solution with the contact lens precursor therein to a temperature of from about 35° C. to about 140° C. to form the contact lens.
94. The method of embodiment 93, wherein the contact lens precursor inherently comprises comprise first reactive functional groups on and/or near the concave and convex surfaces.
95. The method of embodiment 94, wherein the contact lens precursor is obtained by polymerizing a polymerizable composition comprising from about 0.1% to about 10% by weight of a vinylic monomer which further comprises at least one first reactive functional group.
96. The method of embodiment 94, wherein the contact lens precursor is obtained by polymerizing a polymerizable composition comprising from about 0.25% to about 7% by weight of a vinylic monomer which further comprises at least one first reactive functional group.
97. The method of embodiment 94, wherein the contact lens precursor is obtained by polymerizing a polymerizable composition comprising from about 0.5% to about 5% by weight of a vinylic monomer which further comprises at least one first reactive functional group.
98. The method of embodiment 94, wherein the contact lens precursor is obtained by polymerizing a polymerizable composition comprising from about 0.75% to about 3% by weight of a vinylic monomer which further comprises at least one first reactive functional group.

99. The method of any one of embodiments 95 to 98, wherein said at least one first reactive functional group is selected from the group consisting of carboxyl group, amino group, azetidinium group, epoxy group, aziridine group, and combinations thereof.

100. The method of embodiment 93, wherein the contact lens precursor is obtained by subjecting a preformed contact lens to a surface treatment to have the first reactive functional groups.

101. The method of embodiment 100, wherein the surface treatment comprises at least one process selected from the group consisting of a plasma treatment; a chemical treatment; a chemical vapor deposition; grafting (covalently attaching) of one or more compounds each having at least one reactive functional groups onto the preformed contact lens; graft-polymerizing of one or more vinylic monomers having at least one first reactive functional group onto the preformed contact lens; layer-by-layer ("LbL") deposition of one or more polymeric materials having first reactive functional groups onto the preformed contact lens; covalently attaching of one or more polymeric materials having first reactive functional groups onto the preformed contact lens; and combinations thereof.

102. The method of embodiment 100, wherein the surface treatment comprises a plasma treatment.

103. The method of embodiment 100 or 102, wherein the surface treatment comprises grafting (covalently attaching) of one or more compounds each having at least one reactive functional groups onto the preformed contact lens.

104. The method of embodiment 100 or 102, wherein the surface treatment comprises graft-polymerizing of one or more vinylic monomers having at least one first reactive functional group onto the preformed contact lens.

105. The method of embodiment 100 or 102, wherein the surface treatment comprises covalently attaching of one or more polymeric materials having first reactive functional groups onto the preformed contact lens.

106. The method of any one of embodiments 100 to 105, wherein the first reactive functional groups are selected from the group consisting of carboxyl groups, amino groups, azetidinium groups, epoxy groups, aziridine groups, and combinations thereof 107. The method of any one of embodiments 93 to 106, wherein the first reactive functional groups are carboxyl groups and/or amino groups and the second reactive functional groups are azetidinium groups, epoxy groups, aziridine groups, or combinations thereof.

108. The method of any one of embodiments 93 to 106, wherein the first reactive functional groups are thiol groups and the second reactive functional groups are azetidinium groups, epoxy groups, aziridine groups, vinylsulfone groups, or combinations thereof.

109. The method of any one of embodiments 93 to 106, wherein the first reactive functional groups are azetidinium groups and the second reactive functional groups are carboxyl groups, amino groups, thiol groups, or combinations thereof.

110. The method of any one of embodiments 93 to 106, wherein the first reactive functional groups are epoxy groups and the second reactive functional groups are carboxyl groups, amino groups, thiol groups, or combinations thereof.

111. The method of any one of embodiments 93 to 106, wherein the first reactive functional groups are aziridine groups and the second reactive functional groups are carboxyl groups, amino groups, thiol groups, or combinations thereof.

112. The method of any one of embodiments 93 to 106, wherein the first reactive functional groups are vinylsulfone groups and the second reactive functional groups are thiol groups.

113. The method of any one of embodiments 93 to 106, wherein the first reactive functional groups are thiol groups and the second reactive functional groups are vinylsulfone groups.

114. The method of any one of embodiments 93 to 113, wherein said at least one hydrophilic polymeric material is a highly-branched hydrophilic polymeric material comprising the second reactive functional groups.

115. The method of embodiment 114, wherein the highly-branched hydrophilic polymeric material comprises vinylsulfone groups and is a partial reaction product of at least one vinylsulfone-containing polymer having vinylsulfone groups with at least one thiol-containing hydrophilic polymer having thiol groups.

116. The method of embodiment 115, wherein said at least one vinylsulfone-containing hydrophilic polymer is selected from the group consisting of a multiarmed polyethylene glycol having terminal vinylsulfone groups or a hydrophilic polymer comprising monomeric units each having a vinylsulfone group and obtained by reacting a divinylsulfone compound with an amino group of an amino-containing monomeric unit (i.e., derived from an amino-containing vinylic monomer), wherein the said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer), 117. The method of embodiment 114, wherein the highly-branched hydrophilic polymeric material comprises epoxy groups and is a partial reaction product of at least one epoxy-containing hydrophilic polymer having epoxy groups with at least one amino-containing hydrophilic polymer having amino groups, at least one carboxyl-containing hydrophilic polymer having carboxyl groups, or at least one thiol-containing hydrophilic polymer having thiol groups.

118. The method of embodiment 117, wherein said at least one epoxy-containing hydrophilic polymer is selected from the group consisting of a multiarmed polyethylene glycol having terminal epoxy groups or a hydrophilic copolymer of an epoxy-containing vinylic monomer, wherein said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer), wherein said at least one amino-containing hydrophilic polymer is a hydrophilic copolymer of an amino-containing vinylic monomer, wherein said at least one carboxyl-containing hydrophilic polymer is a hydrophilic copolymer of a carboxyl-containing vinylic monomer.
119. The method of embodiment 114, wherein the highly-branched hydrophilic polymeric material comprises aziridine groups and is a partial reaction product of at least one aziridine-containing hydrophilic polymer having aziridine groups with at least one amino-containing hydrophilic polymer having amino groups, at least one carboxyl-containing hydrophilic polymer having carboxyl groups, or at least one thiol-containing hydrophilic polymer having thiol groups.
120. The method of embodiment 119, wherein said at least one aziridine-containing hydrophilic polymer is a hydrophilic copolymer of an aziridine-containing vinylic monomer, wherein said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer), wherein said at least one amino-containing hydrophilic polymer is a hydrophilic copolymer of an amino-containing vinylic monomer, wherein said at least one carboxyl-containing hydrophilic polymer is a hydrophilic copolymer of a carboxyl-containing vinylic monomer.
121. The method of embodiment 114, wherein the highly-branched hydrophilic polymeric material comprises azetidinium groups and is a partial reaction product of at least one azetidinium-containing polymer with at least one hydrophilicity-enhancing polymer having at least one carboxyl, primary amine, secondary amine, or thiol group.
122. The method of embodiment 121, wherein the thermally-crosslinkable hydrophilic polymeric material comprises:
  (i) from about 20% to about 95% by weight of first polymer chains derived from said at least one azetidinium-containing polymer,
  (ii) from about 5% to about 80% by weight of second polymer chains derived from said at least one hydrophilicity-enhancing polymer having at least one reactive functional group selected from the group consisting of amino group, carboxyl group, thiol group, and combination thereof (preferably carboxyl groups), wherein the second polymer chains are covalently attached to the first polymer chains through one or more covalent linkages each formed between one azetidinium group of the azetidinium-containing polymer and one amino, carboxyl or thiol group of the hydrophilicity-enhancing agent, and
  (iii) azetidinium groups which are parts of the first polymer chains or pendant or terminal groups covalently attached to the first polymer chains.
123. The method of embodiment 121 or 122, wherein said at least one azetidinium-containing polymer is a polyamidoamine-epichlorohydrin.
124. The method of embodiment 121 or 122, wherein said at least one azetidinium-containing polymer is poly(2-oxazoline-co-ethyleneimine)-epichlorohydrin.
125. The method of any one of embodiments 121 to 124, wherein the hydrophilicity-enhancing polymer is a primary amine-containing polysaccharide, a secondary amine-containing polysaccharide, a carboxyl-containing polysaccharide, hyaluronic acid, chondroitin sulfate, or a combination thereof.
126. The method of any one of embodiments 121 to 124, wherein the hydrophilicity-enhancing polymer is: a polyethylene glycol having one sole amino, carboxyl or thiol group; a polyethylene glycol with two terminal amino, carboxyl and/or thiol groups; a multi-arm polyethylene glycol with one or more amino, carboxyl and/or thiol groups; a polyethylene glycol dendrimer with one or more amino, carboxyl and/or thiol groups.
127. The method of any one of embodiments 121 to 124, wherein the hydrophilicity-enhancing polymer is a copolymer which is a polymerization product of a composition comprising (1) about 60% or less by weight of one or more reactive vinylic monomers and (2) one or more non-reactive hydrophilic vinylic monomers.
128. The method of embodiment 127, wherein said one or more reactive vinylic monomers are vinylic monomers having a carboxyl group (preferably are selected from the group consisting of acrylic acid, methacrylic acid, ethyl acrylic acid, N,N-2-acrylamidoglycolic acid, and combinations thereof).
129. The method of embodiment 127, wherein said one or more reactive vinylic monomers are vinylic monomers having an amino group (preferably are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof).
130. The method of any one of embodiments 127 to 129, wherein said one or more non-reactive vinylic monomers are selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof (preferably from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof).
131. The method of any one of embodiments 127 to 129, wherein said one or more non-reactive vinylic monomers are phosphorylcholine-containing vinylic monomers (preferably methacryloyloxyethyl phosphorylcholine).
132. The method of any one of embodiments 127 to 131, wherein the composition comprises about 50% or less by weight (preferably from about 0.1% to about 30% by weight, more preferably from about 0.5% to about 20% by weight, even more preferably from about 1% to about 15% by weight) of said one or more reactive vinylic monomers.

133. The method of any one of embodiments 121 to 132, wherein the contact lens precursor has a base coating thereon, wherein the coating comprises a layer of a polyanionic polymer having carboxyl groups.

134. The method of embodiment 133, wherein the polyanionic polymer is polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), or a mixture thereof.

135. The method of any one of embodiments 93 to 134, where the first reactive functional groups are not vinylsulfone groups, the step of heating is performed by autoclaving the preformed contact lens with the first reactive functional groups thereon immersed in the aqueous solution which is a packaging solution in a sealed lens package at a temperature of from about 115° C. to about 125° C. for approximately 20-90 minutes.

136. The method of embodiment 135, wherein packaging solution is a buffered aqueous solution that has a pH of from 6.7 to 7.6 and comprises from about 0.01% to about 2% by weight of the hydrophilic polymeric material having the second reactive functional groups.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1.

Surface Wettability Tests

Water contact angle (WCA) on a contact lens is a general measure of the surface wettability of a contact lens. In particular, a low water contact angle corresponds to more wettable surface. The dynamic captive bubble contact angles of contact lenses are measured using a FDS instrument device from FDS Future Digital Scientific Corp. The FDS equipment is capable of measuring the advancing and receding contact angles. The measurement is performed on hydrated contact lenses at room temperature. A contact lens is removed from the vial and soaked in 40 mL fresh PBS and shake for at least 30 minutes, then replace with fresh PBS, soak and shake for another 30 minutes unless otherwise specified. The contact lens is then put on a lens paper and dabbed to remove surface water prior to be placed on top of a lens holder with front curve up then screw the lens holder top on. Place the secure lens holder into the glass cell cuvette filled with filtered PBS. Place the glass cell cuvette onto the stage of the FDS instrument. Adjust the stage height and the syringe needle to dispense the air bubble to the lens surface. Repeat dispense/withdrawal 3 cycles for every lens to get the advancing and receding contact angles. The receding contact angles are reported in the examples below.

Water Break-up Time (WBUT) Tests

The surface hydrophilicity of lenses (after autoclave) is assessed by determining the time required for the water film to start breaking on the lens surface. Lenses exhibiting WBUT≥10 seconds are considered to have a hydrophilic surface and are expected to exhibit adequate wettability (ability to support the tear film) on-eye.

Lenses are prepared for water breakup measurement by removing the lens from its blister with soft plastic tweezers (e.g., those from Menicon) and placing the lens in a test tube containing phosphate buffered saline. The test tube contains 10 mL phosphate buffered saline per lens, 1 lens per test tube. Lenses are soaked overnight (at least 16 hours) before testing.

WBUT is measured at room temperature as follows: the lens is removed from the test tube and placed on a pedestal submerged in PBS. The pedestal is then raised out of the PBS solution (t=0), and a video camera monitors the fluid flowing off the lens surface. When the lens surface fluid breaks, this WBUT time is recorded. Optionally, a stop watch can be used to measure the time between when the pedestal is raised out of the PBS and when the lens surface fluid breaks. The pedestal is withdrawn, pulling the lens beneath the surface of the PBS. At least 3 spots per lenses are measured, and at least 3 lenses are measured to obtain an average WBUT measurement for each lens group.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Surface Softness of Contact Lenses

All surface modified contact lenses can have different surface modulus than their bulk properties. In particular, a contact lens with a soft hydrogel coating thereon will have a softer surface modulus than bulk. The apparent surface modulus properties of a contact lens in the region near the surface and including the surface can be characterized by measuring indentation depths of an indenting probe having a tip radius of 9.5 μm and a stiffness of 0.54 N/m at 5 KPa compression pressure against one of the surfaces of a contact lens in a nanoindentation test. This cantilever stiffness is recommended for surface modulus between 1-500 kPa, and other cantilevers could be used for stiffer or softer surface samples.

Nano-Indentation Tests

The indentation depth of an indenting probe having a tip radius of 9.5 μm and a stiffness of 0.54 N/m at 5 KPa compression pressure against one of the surfaces of a contact lens is measured in micro-indentation tests as follows.

Figure 2:
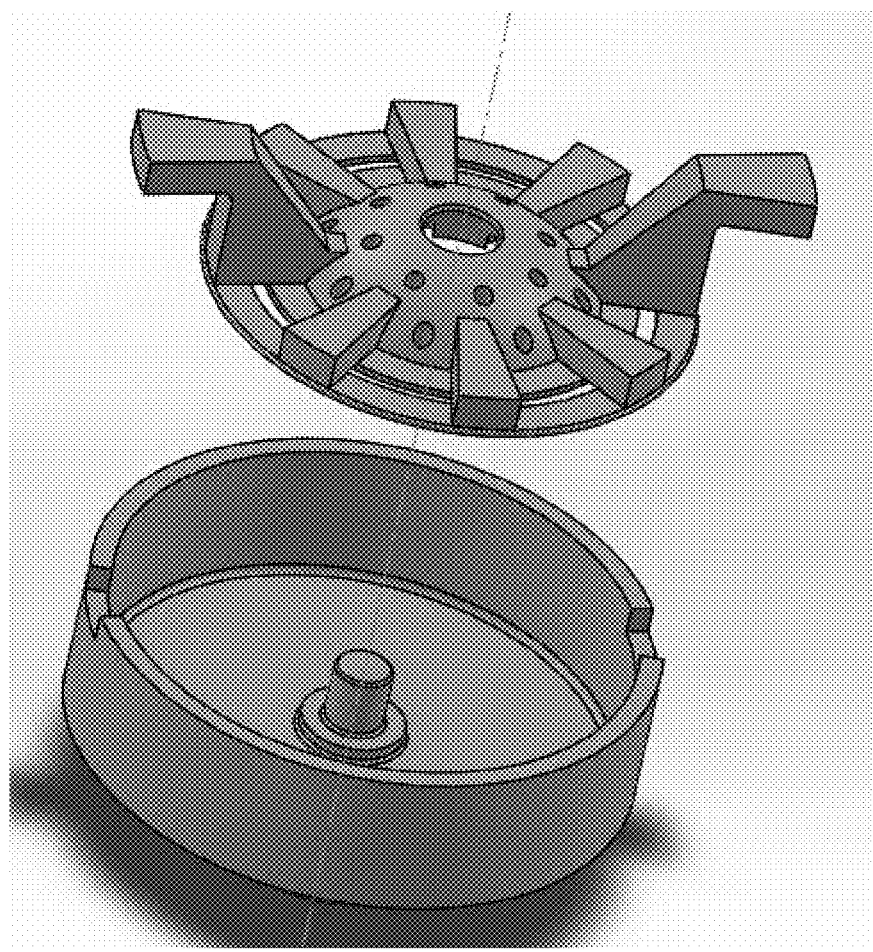
FIG. 2 schematically illustrates a lens holder for performing nano-indentation measurements of contact lenses with Optics11 Puima nano-indentation instrument.

The Optics11 Piuma device is used to determine indentation depth function of displacement. Before indentations are performed, the Piuma probe is calibrated in the testing solution of choice (i.e. PuriLens plus, OPTIFREE Replenish vehicle, PBS), following instructions from the manual (see https://optics11life.com/wp-content/uploads/2019/05/Piuma-Nanoindenter-Manual.pdf). This calibration consists of first calibrating the optical sensor while the probe is submersed in the testing solution, but not engaged in contact with a surface of a substrate. Next, a second cantilever calibration is performed by making a test indentation on a glass slide. Lenses are rinsed with the testing solution to wash off excess lens package solution (30-50 ml of testing solution for 10-20 minutes). The lens holder bottom (shown in FIG. 2) is filled with 25 ml of testing solution and allowed to degas for at least 5 minutes. After soaking, the lens is placed (testing side up) onto the center post of the lens holder bottom. The lens should be placed so the lens edge is facing away from the holder. Then the lens is inverted onto the post, minimizing leaving air bubbles or excess testing solution.

The top piece is placed onto the bottom piece, and locked into place, firmly seating the lens. Then the holder is placed onto the testing the stage, and the lens center is aligned with the probe. Ensure enough testing solution fully submerges the sample.

Finally, the Piuma probe is brought just above lens surface (~1-2 mm away), submerging the probe in the test solution. Continue dripping solution down the probe surface until the cantilever is fully immersed and the signal is stable.

The nano-indentation "find surface" routine is performed according to the manufacturer's typical procedures. The indentation routine consists of a 10 μm indentation at a rate of 1 μm/sec. The probe moves to the surface, where the contact point is determined by the first deflection detected by the cantilever. Typically 3 indents are made at multiple spots (i.e. 16) on the lens surface at large distances between spots (i.e. 250 microns), and five lenses per lens type typically are tested.

The typical Piuma probe used to characterize surface modulus between 1-500 kPa has a stiffness of 0.54 N/m and a tip radius of 9.5 μm. The area of contact of the spherical cap ($S_{cap}$) can be calculated by:

$$S_{cap}=2\pi Rh$$

in which "R" is the tip radius and h is the indentation depth.

As the indentation is performed, both the depth of the indentation and the indentation force is recorded. To calculate the indentation depth at 5 kPa, the indent force is divided by the contact area of the spherical cap to obtain indentation pressure. The indent distance at 5 kPa (typical eyelid pressure is between 1-5 kPa) can be reported from this data set.

All the raw data is processed using MATLAB and analyzed using Excel.

Chemicals

The following abbreviations are used in the following examples: AMA represents allyl methacrylate; NVP represents N-vinylpyrrolidone; MMA represents methyl methacrylate; TEGDMA represent triethyleneglycol dimethacrylate; EGMA represents ethylene glycol methyl ether methacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; RB247 is Reactive Blue 247; TAA represents tert-amyl alcohol; PAA represents polyacrylic acid; PAE represents polyamidoamine-epichlorohydrin (a.k.a., polyamine-epichlorohydrin); MPC represent 2-methacryloyloxyethyl phosphorylcholine; Poly(AAm-co-AA) represents poly(acrylamide-co-acrylic acid); PBS represents a phosphate-buffered saline which has a pH of 7.2±0.2 at 25° C. and contains about 0.044 wt. % $NaH_2PO_4$—$H_2O$, about 0.388 wt. % $Na_2HPO_4.2H_2O$, and about 0.79 wt. % NaCl and; wt. % represents weight percent; mSi1 represents monobutyl-terminated monomethacryloxypropyl-terminated polydimethylsiloxane (Mw~600 to 800 g/mol from Gelest); "GA" macromer represents a di-methacryloyloxypropyl-terminated polysiloxane (Mn~6.8K g/mol, OH content~1.2 meq/g) of formula (A).

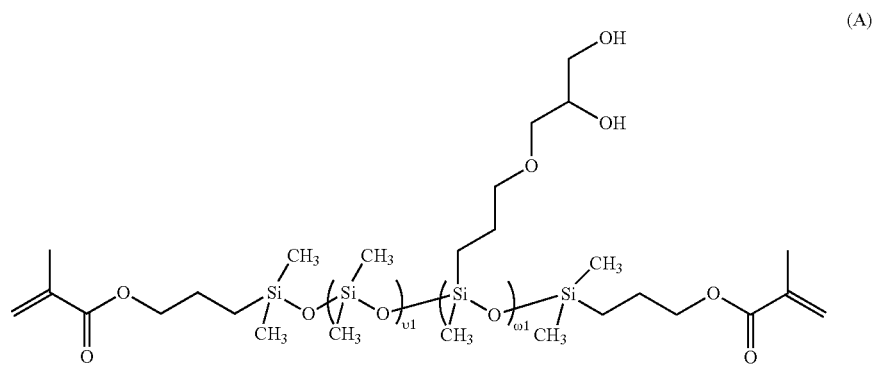

(A)

Example 2

Preparation of Polymerizable Compositions

A lens formulation (polymerizable composition) is prepared to have compositions (in unit parts) as following: mSi1 (34 unit weight parts); GA (6 unit weight parts); NVP (40 unit weight parts); MMA (10 unit weight parts); EGMA (10 unit weight parts); TEGDMA (0.4 unit weight part); AMA (0.1 unit weight part); Nobloc (1 unit weight part); VAZO 64 (0.5 unit weight part); RB 247 (0.01 unit weight part); TAA (1 unit weight part). The formulation is prepared by adding listed components in their targeted amounts into a clean bottle, with a stir bar to mix at 600 rpm for 30 minutes at room temperature. After all the solid is dissolved, a filtration of the formulation is carried out by using 2.7 µm glass-microfiber-filter (GMF).

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

The obtained silicone hydrogel (SiHy) contact lenses (uncoated SiHy lenses) are subjected to the following post-molding processes before lens characterization. After demolding, SiHy lenses prepared above are immersed twice in PBS for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C. The SiHy lenses have an oxygen permeability (measured according to polarographic method) of about 83 barrers, a bulk elastic modulus of about 0.67 MPa, a water content of about 50% by weight, a relative ion permeability of about 11.0 relative to Alsacon lens, and a WBUT of zero second.

Example 3

Preparation of PAA Aqueous Solution

An aqueous solution of polyacrylic acid (PAA) is prepared by adding adequate amount of PAA (Mn~450 KD) in water (distilled or deionized water). After PAA is fully dissolved, the pH is adjusted by adding ~1.85% formic acid to the PAA aqueous solution to about 2. The target concentration of PAA is about 0.1% by weight. The prepared PAA aqueous solution is filtered to remove any particulate or foreign matter.

Phosphate Buffered Saline (PBS)

A phosphate buffered saline is prepared by dissolving $NaH_2PO_4·H_2O$, $Na_2HPO_4·2H_2O$, and in a given volume of purified water (distilled or deionized) to have the following composition: ca. 0.044 w/w % $NaH_2PO_4·H_2O$, ca. 0.388 w/w/% $Na_2HPO_4·2H_2O$, and ca. 0.79 w/w % NaCl.

Phosphate Buffered (PB) without NaCl (PB, No NaCl)

PB is prepared using the same procedure for preparing PBS, but no NaCl is added.

IPC Saline

IPC saline is prepared by dissolving/mixing appropriate amounts of Poly(AAm-co-AA)(90/10), PAE, $NaH_2PO4·H_2O$, $Na_2HPO_4·2H_2O$ and NaCl in DI (de-ionized) water to have the following concentrations: about 0.132 wt. % of poly(AAm-co-AA); about 0.11 wt. % PAE; about 0.044 wt. % $NaH_2PO4·H_2O$, about 0.388 wt. % $Na_2HPO_4·2H_2O$, and about 0.79 wt. % NaCl and then by adjusting pH to about 7.3. Poly(AAm-co-AA)(90/10) partial sodium salt, poly(AAm-co-AA) 90/10, Mw 200,000) is purchased from Polysciences, Inc. and used as received. The prepared solution is pre-treated at 65° C. for about 6 hours. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

SiHy Lenses with PAA Base Coating

After de-molding, SiHy contact lenses (prepared in Example 2) are placed in adequate trays. Then the trays with lenses are immersed in a PAA solution for a certain periods of time, either for 120 min in one bath of PAA, or in two consecutive baths of PAA with 30 min dip in the $1^{st}$ bath and 90 min dip in the $2^{nd}$ bath. The PAA dip solution is heated to above room temperature, for example 40° C. Adequate agitation (e.g. horizontal shaking or up-down movement) may be used to ensure appropriate flow of PAA solution during the dip step.

After PAA dip, the lenses are transferred to a bath with PB for up to about an hour, usually at room temperature. Adequate agitation (e.g. horizontal shaking or up-down movement) may be used to ensure appropriate flow of PB during the dip step.

Then lenses are transferred to a bath with water for about 5~10 min, usually at room temperature. Adequate agitation (e.g. horizontal shaking or up-down movement) may be used to ensure appropriate flow of water during the dip step.

SiHy Contact Lenses with a Hydrogel Coating thereon

SiHy lenses with a PAA base coating thereon, prepared above, are placed in polypropylene lens packaging shells (one lens per shell) containing about 0.15-0.3 mL of the IPC saline in one of the following 3 positions: Position I (the posterior surface facing down while the anterior surface facing up); Position II (the posterior surface facing up while the anterior surface facing down); and Position III (the inverted posterior surface facing down while the inverted anterior surface facing up). About 0.35-0.5 mL of the IPC saline is dosed into the concave surface (i.e., the posterior surface or the inverted anterior surface) with some overflow of the IPC saline in the packaging shell. The blisters (packaging shells) are then sealed with foil and autoclaved for about 45 minutes at about 121° C., forming SiHy contact lenses with a cross-linked hydrophilic coating (i.e., a hydrogel coating) thereon. The shells are maintained horizontally during autoclave to ensure the specified position of the anterior and posterior surface of the contact lens.

Surface Properties of SiHy Contact Lenses with a Hydrogel Layer Thereon

The resultant SiHy contact lenses (autoclaved in Position I) directly out of package have a WBUT>10 seconds and a water contact angle by sessile drop (static)<55 degrees.

Example 4

The surface softness of contact lenses are determined according to the procedures described in Example 1. Uncoated contact lenses (EWC~50%; bulk elastic modulus~0.69 MPa) prepared in Example 2, coated contact lenses (EWC~50%; bulk elastic modulus~0.69 MPa) prepared in Example 3, and commercially available contact lenses BioTrue™ (EWC~78%; bulk elastic modulus~0.49 MPa Bausch & Lamb) are used in this example. The results are reported in Table 1.

TABLE 1

| Lenses | Power (Diopter) | Auto-clave Position | # lenses | # tests per surface | $(Id)_{PS}$ (nm) | $(Id)_{AS}$ (nm) |
|---|---|---|---|---|---|---|
| Example 2 | | | 1 | 24 | 54 ± 20 | 77 ± 30 |
| Example 3 | −3.00 | I | 3 | 48 | 340 ± 50 | 420 ± 60 |
| Example 3 | −3.50 | II | 3 | 16 | 670 ± 10 | 460 ± 100 |
| Example 3 | −7.00 | III | 3 | 16 | 730 ± 20 | 420 ± 30 |
| BioTrue | −0.50 | | 3 | 19 | 25 ± 20 | 35 ± 30 |

It should point out that, as discussed above, the value of indentation depth measured with an indenting probe having a tip radius of 9.5 μm and a stiffness of 0.54 N/m at 5 KPa compression pressure against a lens surface in a nanoindentation test reflects the apparent compliance (i.e., surface softness) at that surface. The larger the value is, the softer that surface is.

Table 1 shows: that both the posterior and anterior surfaces of the coated lenses are much softer than those of BioTrue lenses, even though the BioTrue lenses have a bulk elastic modulus (0.49 MPa) lower than the bulk modulus of the coated lense; that both the posterior and anterior surfaces of the coated lenses are much softer than those of the uncoated lenses; and that the autoclave position of the lens in the lens package can affect the surface softness of the posterior and anterior surfaces of a contact lens coated directly in the package during autoclave.

Example 5

Figure 3:
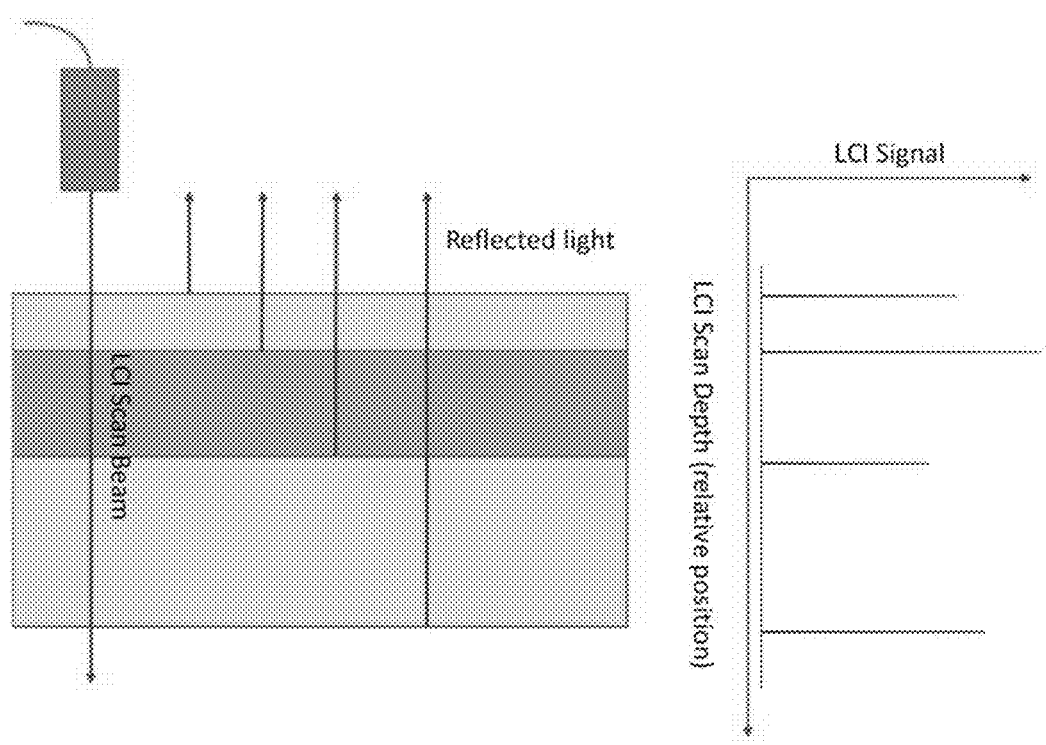
FIG. 3 schematically shows the low coherence interferometer (LCI).

This example illustrates how to qualitatively determine whether the posterior and anterior surfaces of a contact lens would have a difference in material and/or structural properties at surfaces, according to low coherence interferometer (LCI) which is shown in FIG. 3.

Figure 4:
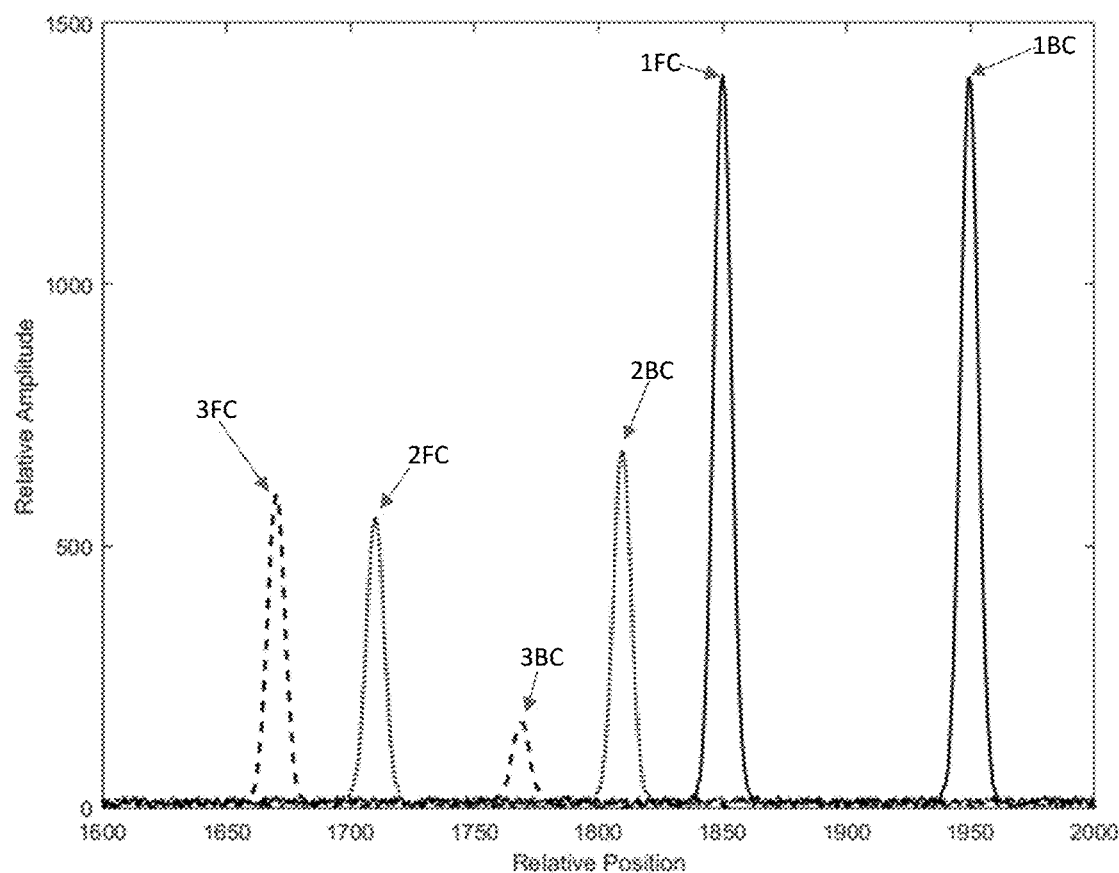
FIG. 4 shows data collected on a LCI system with the scanning probe positioned from above the lens. The x-axis is the relative position (or depth) measured as optical path distance (OPD), in units of microns; the y-axis is the signal intensity from the low coherence interferometer (LCI), in arbitrary units, but is proportional to the amount of back-reflected light from the surface. The peak signal for FC surface comes before the BC surface.

Like ultra-sound, LCI use a fine beam of light (beam width 40 μm) to measure thickness of a multilayered article. It relies on reflected light from surfaces between layers. The surfaces of multiple layers of materials are detected as peaks in a depth-scanned signal. The center position of each peak defines a surface (interface) position. The peak intensity is proportional to the reflected light from the surface. In the tests, a contact lens is placed inside a saline-filled cuvette or wetcell, sitting on a flat window with the posterior surface facing down. The scanning probe can be positioned from above the lens or below the lens.

Where a contact lens has identical material and mechanical properties at two lens surfaces, the FC and BC signal peaks are expected to be of the same intensity (e.g., see Peaks 1FC and Peak 1BC for FC and BC surface respectively of a commercial AIR Optix Plus Hydraglyde lens (Alcon) in FIG. 4).

For the commercial DAILIES@ TOTAL1 lens (Alcon) tested, the FC signal peak 2FC is slightly lower than the BC signal peak 2BC (FIG. 4).

However, for the coated contact lenses prepared in Example 3 with autoclave position II, the FC signal peak 3FC is much higher than the BC signal peak 3BC (FIG. 4). The dramatic difference (or differential signal strength) between FC and BC surface signals reflects a difference in optical properties between FC and BC surfaces. In view of the nanoindentation measurement results in Example 4 for the similar contact lenses, these results indicate that the simple optical detection results correlates with the surface softness of the surfaces, i.e., the posterior and anterior surfaces having different material and structural properties.

Figure 5:
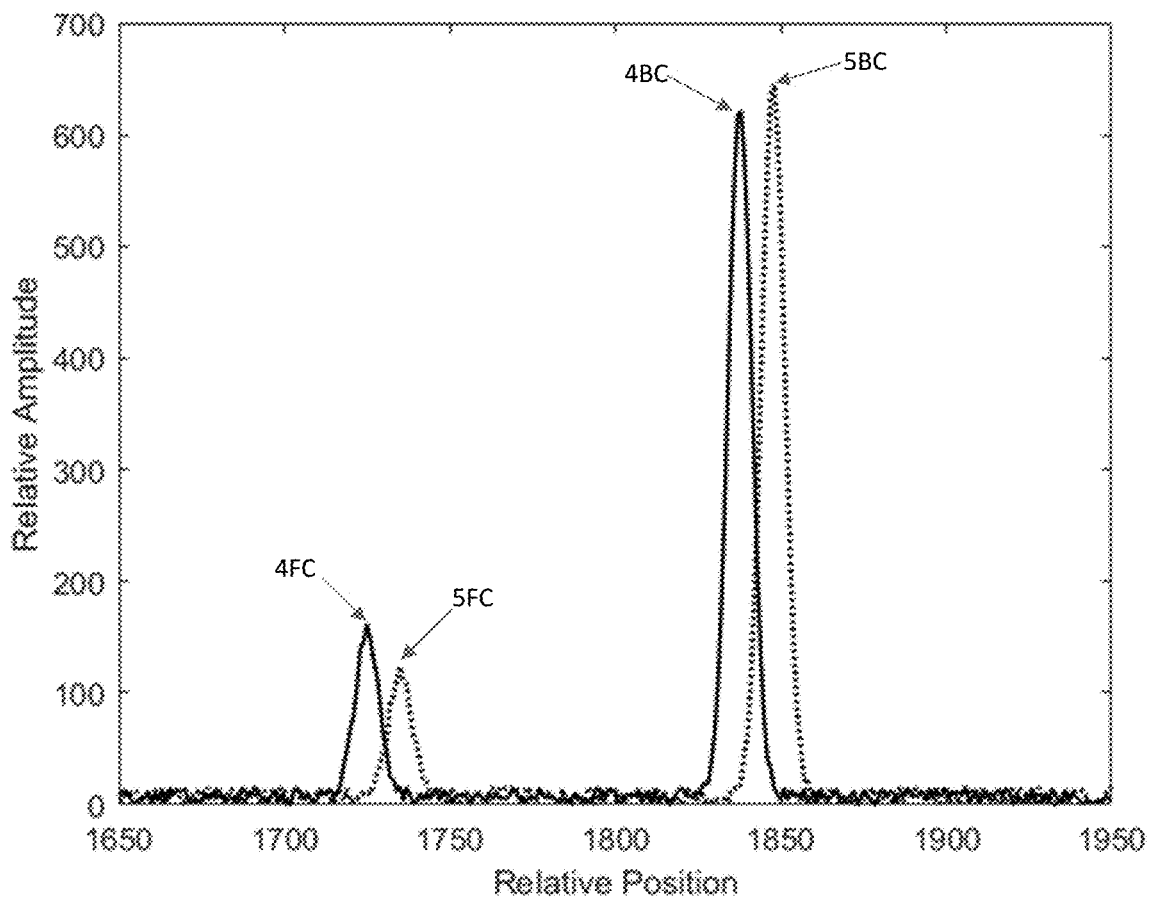
FIG. 5 shows data collected on a LCI system with the scanning probe positioned from below the lens. The x-axis is the relative position (or depth) measured as optical path distance (OPD), in units of microns; the y-axis is the signal intensity from the low coherence interferometer (LCI), in arbitrary units, but is proportional to the amount of back-reflected light from the surface. The peak signal for BC surface comes before the FC surface.

FIG. 5 also shows LCI data collected for lenses which are prepared in Example 3 but with autoclave position III (i.e., inverted the contact lenses before placing in lens packaging and autoclave). The signal strength flips: the peak signal 4FC and 5FC for FC surfaces are much weaker than the peak signal 4BC and 5BC for BC surfaces. This result further confirms that the lens's autoclave position in a lens package during autoclave impact the softness of the posterior and anterior surface of a contact lens coated directly in the package during autoclave.

All the publications and patents which have been cited herein above are hereby incorporated by reference in their entireties.

What is claimed is:

1. A contact lens, comprising a lens bulk material covered with an outer surface hydrogel layer and having a posterior surface and an opposite anterior surface, wherein the outer surface hydrogel layer consists of an anterior outer hydrogel layer and a posterior outer hydrogel layer, wherein the outer posterior surface hydrogel layer is softer than the outer anterior surface hydrogel layer as characterized by having a ratio of indentation depth ratio, $$\frac{(Id)_{PS}}{(Id)_{AS}},$$

of at least about 1.2, wherein $(Id)_{PS}$ is the indentation depth measured with a indenting probe having a tip radius of 9.5 μm and a stiffness of 0.54 N/m at 5 KPa compression pressure against the posterior surface in a nanoindentation test, wherein $(id)_{AS}$ is the indentation depth measured with a indenting probe having a tip radius of 9.5 μm and a stiffness of 0.54 N/m at 5 KPa compression pressure against the anterior surface in a nanoindentation test, wherein the contact lens has a water-break-up time of at least 10 seconds.

2. The contact lens of claim 1, wherein the lens bulk material is a preformed hard contact lens essentially made of a hard plastic material which is a crosslinked polymethacrylate.

3. The contact lens of claim 1, wherein the lens bulk material is a preformed rigid gas permeable contact lens essentially made of a rigid gas permeable lens material.

4. The contact lens according to claim 3, wherein the outer anterior and posterior surface hydrogel layers independent of each another have a thickness of from about 0.2 μm to about 20 μm when being fully hydrated.

5. The contact lens according to claim 1, wherein the lens bulk material is a preformed hybrid contact lens which has a central optical zone essentially made of a rigid gas permeable lens material and surrounded by a peripheral zone essential made of a non-silicone hydrogel material.

6. The contact lens according to claim 1, wherein the lens bulk material is a preformed embedded contact lens, wherein the lens bulk material consists essentially of a 3-dimensional article and a non-silicone hydrogel material, wherein the 3-dimensional article is made of a non-hydrogel material and has a 3-dimensional size smaller than that of the contact lens so that the 3-dimensional article is completely embedded within the non-silicone hydrogel material.

7. The contact lens according to claim 1, wherein the lens bulk material is a preformed non-silicon hydrogel contact lens essentially made of a non-silicone hydrogel material which comprises at least 50% by mole of repeating units of at least one hydroxyl-containing vinylic monomer, wherein the non-silicone hydrogel material has an equilibrium water content of from about 10% to 80% by weight.

8. The contact lens according to claim 1, wherein the lens bulk material is a preformed hybrid contact lens which has a central optical zone essentially made of a rigid gas permeable lens material and surrounded by a peripheral zone essential made of a silicone hydrogel material.

9. The contact lens according to claim 1, wherein the lens bulk material is a preformed embedded contact lens, wherein the lens bulk material consists essentially of a 3-dimensional article and a silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material.

10. The contact lens according to claim 1, wherein the lens bulk material is a preformed non-silicon hydrogel contact lens essentially made of a silicone hydrogel material.

11. The contact lens of claim 10, wherein the silicone hydrogel material has an equilibrium water content of from about 10% to about 80% by weight and an oxygen permeability of from about 50 barrers to about 180 barrers.

12. The contact lens of claim 11, wherein the outer anterior and posterior surface hydrogel layers independent of each another have a thickness of from about 0.05 µm to about 20 µm when being fully hydrated.

13. The contact lens of claim 1, wherein the outer anterior and posterior surface hydrogel layers independent of each another are a crosslinked hydrophilic polymeric material comprising polymer chains each of which includes repeating monomeric units of at least one hydrophilic vinylic monomer which comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl) methyl (meth)acrylamide, 2-hydroxyethyl (meth)acrylate, 3-hydroxypropyl (meth)acrylate, 2-hydroxypropyl (meth) acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth) acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomers having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth) acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(thmethylammonio)ethylphosphate, 5-((meth)acryloyloxy)pentyl-2'-(trimethylammonio)ethyl phosphate, 6-((meth)acryloyloxy)hexyl-2'-(triethylammonio)ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbanylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-8-alanine (VINAL); (14) N-carboxyvinyl-α-alanine; (15) or combinations thereof.

14. The contact lens of claim 1, wherein the outer anterior and posterior surface hydrogel layers independent of each another are a crosslinked hydrophilic polymeric material comprising poly(ethylene glycol) chains which are derived directly from: (1) a pol(ethylene glycol) having one sole functional group of —$NH_2$, —SH, —COOH, epoxy group, or vinylsulfone; (2) a poly(ethylene glycol) having two terminal functional groups selected from the group consisting of —$NH_2$, —COOH, —SH, epoxy group, vinylsulfone, and combinations thereof; (3) a multi-arm poly(ethylene glycol) having one or more functional groups selected from the group consisting of —$NH_2$, —COOH, —SH, epoxy group, vinylsulfone, and combinations thereof; or (4) combinations thereof.

15. The contact lens of claim 1, wherein the outer anterior and posterior surface hydrogel layers independent of each another have an equilibrium water content of at least 80% by weight.

\* \* \* \* \*